US010927041B2

(12) United States Patent
Lukkarila et al.

(10) Patent No.: US 10,927,041 B2
(45) Date of Patent: *Feb. 23, 2021

(54) CURABLE FORMULATIONS FOR STRUCTURAL AND NON-STRUCTURAL APPLICATIONS

(71) Applicant: MSB Global, Inc., Greenwich, CT (US)

(72) Inventors: Mark R. Lukkarila, Belle Plaine, MN (US); Kevin A. MacDonald, Savage, MN (US); Sam F. Marshall, Hidden Hills, CA (US); Matthew D. Spencer, New York, NY (US)

(73) Assignee: MSB Global, Inc., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,426

(22) Filed: Aug. 28, 2020

(65) Prior Publication Data

US 2020/0392042 A1  Dec. 17, 2020

Related U.S. Application Data

(63) Continuation of application No. 16/831,748, filed on Mar. 26, 2020, now Pat. No. 10,759,697.

(60) Provisional application No. 62/938,307, filed on Nov. 20, 2019, provisional application No. 62/859,741, filed on Jun. 11, 2019.

(51) Int. Cl.
| | |
|---|---|
| *C04B 9/04* | (2006.01) |
| *C04B 18/06* | (2006.01) |
| *C04B 9/02* | (2006.01) |
| *C04B 103/10* | (2006.01) |
| *C04B 111/26* | (2006.01) |

(52) U.S. Cl.
CPC .................. *C04B 9/04* (2013.01); *C04B 9/02* (2013.01); *C04B 18/067* (2013.01); *C04B 2103/10* (2013.01); *C04B 2111/26* (2013.01)

(58) Field of Classification Search
CPC C04B 9/02; C04B 9/04; C04B 18/067; C04B 2103/10; C04B 2111/26; C04B 14/042; C04B 14/06; C04B 14/10; C04B 14/14; C04B 14/16; C04B 14/305; C04B 16/04; C04B 18/08; C04B 18/141; C04B 22/066; C04B 22/085; C04B 22/124; C04B 22/142; C04B 22/16; C04B 28/021; C04B 28/105; C04B 28/08; C04B 28/184; C04B 28/30; C04B 28/32; C04B 40/0259; C04B 2103/30; C04B 2103/40; C04B 2103/54; C04B 2103/61; C04B 2103/63; C04B 2103/65; C04B 2103/0012; C04B 2111/10; C04B 2111/00112; C04B 2111/1018
See application file for complete search history.

(56) References Cited

U.S. PATENT DOCUMENTS

| | | | |
|---|---|---|---|
| 2,000,243 | A | 5/1935 | Manske |
| 2,808,136 | A | 10/1957 | Hammitt et al. |
| 3,292,328 | A | 12/1966 | Lewis et al. |
| 3,408,781 | A | 11/1968 | Pollock |
| 3,753,328 | A | 8/1973 | Papsco |
| 3,826,051 | A | 7/1974 | Miller et al. |
| 4,672,785 | A | 6/1987 | Salvo |
| 5,072,569 | A | 12/1991 | Vantassel |
| 5,631,097 | A | 5/1997 | Andersen et al. |
| 5,641,584 | A | 6/1997 | Andersen et al. |
| 6,214,159 | B1 | 4/2001 | Armin et al. |
| 6,274,525 | B1 | 8/2001 | Zborowski et al. |
| 6,368,394 | B1 | 4/2002 | Hughes et al. |
| 6,409,820 | B1 | 6/2002 | Novak |
| 6,433,114 | B1 | 8/2002 | Kinoshita et al. |
| 6,491,751 | B1 | 12/2002 | Watson |
| 6,506,828 | B1 | 1/2003 | Anabuki et al. |
| 6,512,039 | B1 | 1/2003 | Mowrey |
| 6,517,631 | B1 | 2/2003 | Bland |
| 6,569,793 | B2 | 5/2003 | Hockman et al. |
| 6,586,355 | B2 | 7/2003 | Hoover et al. |
| 6,586,502 | B2 | 7/2003 | Wallace et al. |
| 6,592,997 | B2 | 7/2003 | Lewis et al. |
| 6,617,376 | B2 | 9/2003 | Korney, Jr. |
| 6,662,873 | B1 | 12/2003 | Nguyen et al. |
| 6,710,119 | B2 | 3/2004 | Kimura et al. |
| 6,730,159 | B1 | 5/2004 | Falaschi et al. |

(Continued)

FOREIGN PATENT DOCUMENTS

| | | |
|---|---|---|
| CN | 101538910 | 9/2009 |
| CN | 202073197 | 12/2011 |

(Continued)

OTHER PUBLICATIONS

Abdel-Gawwad, HA, "Effect of Reactive Magnesium Oxide on Properties of Alkali Activated Slag Geopolymer Cement Pastes," The 2014 World Congress on Advances in Civil, Environmental, and Materials Research, ACEM14 (Aug. 2014).
Averiina, G et al., "Investigation of Magnesium Oxychloride Cement at the Initial Hardening Stage," MATEC Web of Conferences, vol. 143 (2018).
Bentz, DP et al., "Verdict: Viscosity Enhancers Reducing Diffusion in Concrete Technology, A New Approach to Decreasing Transport," Concrete International (Jan. 2009).
Bernard, ME, "Magnesium Silicate Hydrate (M—S—H) Characterization: Temperature, Calcium, Aluminum and Alkali," Doctorat de Chimie et Physique, Thèse De Doctorat De L'établissement Université Bourgogne Franchecomté (France), Préparée À L'empa (Suisse) Ecole doctorale n°553, ED Carnot Pasteur (Nov. 2017).

(Continued)

*Primary Examiner* — Anthony J Green
(74) *Attorney, Agent, or Firm* — Knobbe, Martens Olson & Bear LLP

(57) ABSTRACT

According to some embodiments, a curable mixture configured to set in the presence of water, wherein the mixture comprises magnesium oxide, a primary cementitious component and at least one accelerant. A proportion by weight of the primary cementitious component is 80% to 120% of a proportion of magnesium oxide by weight.

18 Claims, 1 Drawing Sheet

(56) References Cited

U.S. PATENT DOCUMENTS

| | | |
|---|---|---|
| 6,739,806 B1 | 5/2004 | Szymanski et al. |
| 6,761,218 B2 | 7/2004 | Nguyen et al. |
| 6,766,858 B2 | 7/2004 | Nguyen et al. |
| 6,773,639 B2 | 8/2004 | Moyes et al. |
| 6,773,794 B2 | 8/2004 | Lindner |
| 6,808,562 B2 | 10/2004 | Bland |
| 6,809,129 B2 | 10/2004 | Abu-Isa |
| 6,840,996 B2 | 1/2005 | Morioka et al. |
| 6,854,228 B2 | 2/2005 | Arseneau et al. |
| 6,863,972 B2 | 3/2005 | Burger et al. |
| 6,869,473 B2 | 3/2005 | Comrie |
| 6,913,819 B2 | 7/2005 | Wallner |
| 6,921,431 B2 | 7/2005 | Evans et al. |
| 7,036,586 B2 | 5/2006 | Roddy et al. |
| 7,160,383 B2 | 1/2007 | Wagh et al. |
| 7,228,904 B2 | 6/2007 | Todd et al. |
| 7,229,491 B2 | 6/2007 | Davidovits et al. |
| 7,255,907 B2 | 8/2007 | Feigin et al. |
| 7,282,093 B2 | 10/2007 | Brother et al. |
| 7,316,744 B2 | 1/2008 | De Le Roij |
| 7,335,696 B2 | 2/2008 | Yalvac et al. |
| 7,347,896 B2 | 3/2008 | Harrison |
| 7,350,576 B2 | 4/2008 | Robertson et al. |
| 7,396,402 B2 | 7/2008 | Naji et al. |
| 7,402,542 B2 | 7/2008 | Wagh et al. |
| 7,407,545 B2 | 8/2008 | Wallner |
| 7,419,544 B2 | 9/2008 | Naji et al. |
| 7,497,258 B2 | 3/2009 | Savery et al. |
| 7,530,394 B2 | 5/2009 | Santra et al. |
| 7,537,655 B2 | 5/2009 | Abbate |
| 7,632,348 B2 | 12/2009 | Cowan et al. |
| 7,637,319 B2 | 12/2009 | Savery et al. |
| 7,640,985 B2 | 1/2010 | Savery et al. |
| 7,644,548 B2 | 1/2010 | Guevara et al. |
| 7,658,795 B2 | 2/2010 | Caine et al. |
| 7,687,440 B2 | 3/2010 | Reddy et al. |
| 7,708,826 B2 | 5/2010 | Naji et al. |
| 7,740,700 B2 | 6/2010 | Wallner |
| 7,741,412 B2 | 6/2010 | Tanaka et al. |
| 7,744,692 B2 | 6/2010 | Guevara et al. |
| 7,744,693 B2 | 6/2010 | Mabey |
| 7,765,756 B2 | 8/2010 | Bontrager, II |
| 7,781,510 B2 | 8/2010 | Yalvac et al. |
| 7,794,688 B2 | 9/2010 | Caine et al. |
| 7,820,094 B2 | 10/2010 | Ladely et al. |
| 7,833,344 B2 | 11/2010 | Santra et al. |
| 7,850,776 B2 | 12/2010 | Gartner et al. |
| 7,850,870 B2 | 12/2010 | Ahn et al. |
| 7,867,597 B2 | 1/2011 | Feigin et al. |
| 7,883,763 B2 | 2/2011 | Tinianov |
| 7,901,506 B2 | 3/2011 | Zhang |
| 7,905,956 B2 | 3/2011 | Utagaki et al. |
| 7,906,086 B2 | 3/2011 | Comrie |
| 7,906,665 B2 | 3/2011 | Lin et al. |
| 7,909,099 B2 | 3/2011 | Thiercelin |
| 7,955,659 B2 | 6/2011 | Moorlag et al. |
| 7,964,272 B2 | 6/2011 | Guevara et al. |
| 7,993,449 B2 | 8/2011 | de la Roij |
| 7,998,267 B2 | 8/2011 | Gartner et al. |
| 7,998,547 B2 | 8/2011 | Feigin et al. |
| 8,016,937 B2 | 9/2011 | Schumacher et al. |
| 8,025,755 B2 | 9/2011 | Lin |
| 8,029,617 B2 | 10/2011 | Guevara et al. |
| 8,030,236 B2 | 10/2011 | Klischat et al. |
| 8,038,789 B2 | 10/2011 | Boxley |
| 8,066,812 B2 | 11/2011 | Wu et al. |
| 8,066,813 B2 | 11/2011 | Pratt |
| 8,110,039 B2 | 2/2012 | Hunt |
| 8,110,130 B2 | 2/2012 | Kensicher et al. |
| 8,118,929 B2 | 2/2012 | Al-Yami et al. |
| 8,119,758 B2 | 2/2012 | Sakurai et al. |
| RE43,253 E | 3/2012 | Ladely et al. |
| 8,142,856 B2 | 3/2012 | Chevalier |
| 8,143,180 B2 | 3/2012 | Earl et al. |
| 8,153,552 B2 | 4/2012 | Cau Dit Coumes et al. |
| 8,167,998 B2 | 5/2012 | Ladely (Guevara) |
| 8,177,903 B2 | 5/2012 | Walenta et al. |
| 8,182,605 B2 | 5/2012 | Wallner |
| 8,183,186 B2 | 5/2012 | Luo et al. |
| 8,202,345 B2 | 6/2012 | Coburn et al. |
| 8,211,226 B2 | 7/2012 | Bredt et al. |
| 8,257,488 B2 | 9/2012 | Garcia et al. |
| 8,261,827 B2 | 9/2012 | Roddy et al. |
| 8,268,062 B2 | 9/2012 | Lally |
| 8,277,556 B2 | 10/2012 | Berke et al. |
| 8,297,357 B2 | 10/2012 | Brenneis et al. |
| 8,317,915 B2 | 11/2012 | Walenta et al. |
| 8,318,642 B2 | 11/2012 | Roddy et al. |
| 8,328,931 B2 | 12/2012 | Cangiano et al. |
| 8,337,117 B2 | 12/2012 | Vitale et al. |
| 8,337,993 B2 | 12/2012 | Surace et al. |
| 8,343,274 B2 | 1/2013 | Al Yateem |
| 8,366,821 B2 | 2/2013 | Weissman et al. |
| 8,394,193 B2 | 3/2013 | Schwartz |
| 8,397,864 B2 | 3/2013 | Tinianov et al. |
| 8,399,387 B2 | 3/2013 | Roddy et al. |
| 8,414,700 B2 | 4/2013 | Guynn et al. |
| 8,435,441 B2 | 5/2013 | Bookbinder et al. |
| 8,490,707 B2 | 7/2013 | Robisson et al. |
| 8,496,751 B2 | 7/2013 | Vlasopoulos et al. |
| 8,523,997 B2 | 9/2013 | Valentini et al. |
| 8,551,923 B1 | 10/2013 | Benkley et al. |
| 8,555,581 B2 | 10/2013 | Amend |
| 8,555,589 B2 | 10/2013 | Semmens et al. |
| 8,555,967 B2 | 10/2013 | Chatterji et al. |
| 8,562,734 B2 | 10/2013 | Yin et al. |
| 8,563,479 B2 | 10/2013 | Amanullah et al. |
| 8,603,237 B2 | 12/2013 | Rademan et al. |
| 8,641,819 B2 | 2/2014 | Sawabe et al. |
| 8,647,431 B2 | 2/2014 | De La Roij |
| 8,650,823 B2 | 2/2014 | Amend |
| 8,652,248 B2 | 2/2014 | Weissman et al. |
| 8,662,111 B2 | 3/2014 | Al Mehthel et al. |
| 8,663,382 B2 | 3/2014 | Dubey |
| 8,679,632 B2 | 3/2014 | Smith |
| 8,689,873 B2 | 4/2014 | Abad et al. |
| 8,691,376 B2 | 4/2014 | Weir et al. |
| 8,834,624 B2 | 9/2014 | Soltanian et al. |
| 8,834,625 B2 | 9/2014 | Kim et al. |
| 8,857,118 B2 | 10/2014 | Constantz et al. |
| 8,895,485 B2 | 11/2014 | Roddy et al. |
| 8,895,486 B2 | 11/2014 | Roddy et al. |
| 8,895,664 B2 | 11/2014 | Ko et al. |
| 8,911,547 B2 | 12/2014 | Man et al. |
| 8,940,670 B2 | 1/2015 | Patil et al. |
| 8,959,861 B1 | 2/2015 | Wambaugh et al. |
| 9,006,155 B2 | 4/2015 | Roddy et al. |
| 9,023,150 B2 | 5/2015 | Brenneis et al. |
| 9,039,830 B2 | 5/2015 | Alhozaimy et al. |
| 9,051,505 B2 | 6/2015 | Roddy et al. |
| 9,056,791 B2 | 6/2015 | Baxter et al. |
| 9,057,193 B2 | 6/2015 | Amend |
| 9,057,196 B2 | 6/2015 | Amend |
| 9,061,941 B2 | 6/2015 | Kang et al. |
| 9,067,826 B2 | 6/2015 | Bullerjahn et al. |
| 9,073,784 B2 | 7/2015 | Bullerjahn et al. |
| 9,085,487 B2 | 7/2015 | Eleto Da Silva et al. |
| 9,096,465 B2 | 8/2015 | Tuttle et al. |
| 9,102,567 B1 | 8/2015 | Hansen et al. |
| 9,147,819 B2 | 9/2015 | Ko et al. |
| 9,150,773 B2 | 10/2015 | Chatterji et al. |
| 9,157,020 B2 | 10/2015 | Chatterji et al. |
| 9,163,173 B2 | 10/2015 | Muthusamy et al. |
| 9,175,470 B2 | 11/2015 | Yin et al. |
| 9,187,371 B2 | 11/2015 | Fares et al. |
| 9,199,879 B2 | 12/2015 | Thaemlitz et al. |
| 9,212,091 B2 | 12/2015 | Bullerjahn et al. |
| 9,212,093 B2 | 12/2015 | Wu et al. |
| 9,254,582 B2 | 2/2016 | Luke |
| 9,273,242 B2 | 3/2016 | Al-Yami et al. |
| 9,302,940 B2 | 4/2016 | Bullerjahn et al. |
| 9,315,713 B2 | 4/2016 | Patil et al. |
| 9,322,491 B2 | 4/2016 | Al Mehthel et al. |
| 9,340,661 B2 | 5/2016 | Suzuki et al. |

(56) References Cited

U.S. PATENT DOCUMENTS

| | | |
|---|---|---|
| 9,353,308 B2 | 5/2016 | Soltanian et al. |
| 9,382,161 B2 | 7/2016 | Scheubel et al. |
| 9,421,695 B2 | 8/2016 | Ciuperca |
| 9,428,682 B2 | 8/2016 | Muthusamy et al. |
| 9,434,090 B1 | 9/2016 | Luke |
| 9,453,349 B2 | 9/2016 | Pallon |
| 9,464,181 B2 | 10/2016 | Tong et al. |
| 9,481,604 B2 | 11/2016 | Fares et al. |
| 9,512,329 B2 | 12/2016 | Nobukuni et al. |
| 9,527,771 B2 | 12/2016 | Crews et al. |
| 9,540,496 B2 | 1/2017 | Kawai |
| 9,546,313 B2 | 1/2017 | Tomlinson |
| 9,587,121 B2 | 3/2017 | Yang et al. |
| 9,598,308 B2 | 3/2017 | Yang et al. |
| 9,617,185 B2 | 4/2017 | Ferrari et al. |
| 9,617,460 B2 | 4/2017 | Reddy |
| 9,695,351 B2 | 7/2017 | Yadav et al. |
| 9,695,590 B2 | 7/2017 | Amend |
| 9,708,219 B2 | 7/2017 | Waters |
| 9,708,869 B2 | 7/2017 | Sarmah et al. |
| 9,718,731 B2 | 8/2017 | Bullerjahn et al. |
| 9,725,901 B2 | 8/2017 | Chu et al. |
| 9,738,821 B2 | 8/2017 | Patil et al. |
| 9,739,066 B2 | 8/2017 | Bolin |
| 9,745,443 B2 | 8/2017 | Shimizu et al. |
| 9,764,057 B2 | 9/2017 | Nies |
| 9,775,238 B2 | 9/2017 | Ueyama et al. |
| 9,796,928 B2 | 10/2017 | Yang et al. |
| 9,809,494 B2 | 11/2017 | Rademan et al. |
| 9,809,737 B2 | 11/2017 | Roddy et al. |
| 9,815,738 B2 | 11/2017 | Rademan et al. |
| 9,822,036 B2 | 11/2017 | Zhang |
| 9,828,293 B2 | 11/2017 | Yadav et al. |
| 9,834,478 B2 | 12/2017 | Stenger |
| 9,834,479 B2 | 12/2017 | Gong et al. |
| 9,840,440 B2 | 12/2017 | Wan et al. |
| 9,856,390 B2 | 1/2018 | Bredt et al. |
| 9,920,179 B2 | 3/2018 | Chuang |
| 9,944,063 B1 | 4/2018 | Lakrout et al. |
| 9,944,787 B2 | 4/2018 | Saito et al. |
| 9,963,885 B2 | 5/2018 | Taylor, Jr. et al. |
| 10,011,764 B2 | 7/2018 | Bhamidipati et al. |
| 10,023,491 B2 | 7/2018 | Zhao et al. |
| 10,029,945 B2 | 7/2018 | Werz et al. |
| 10,040,216 B2 | 8/2018 | Bai et al. |
| 10,040,986 B2 | 8/2018 | Pandey et al. |
| 10,047,256 B2 | 8/2018 | Yoshimoto et al. |
| 10,053,959 B2 | 8/2018 | Ayub et al. |
| 10,059,870 B2 | 8/2018 | Joseph et al. |
| 10,065,892 B2 | 9/2018 | Kim et al. |
| 10,066,146 B2 | 9/2018 | Morgan et al. |
| 10,072,176 B2 | 9/2018 | Abrami et al. |
| 10,077,212 B2 | 9/2018 | Muthusamy et al. |
| 10,093,794 B2 | 10/2018 | Yu et al. |
| 10,106,462 B2 | 10/2018 | Fourberg et al. |
| 10,113,389 B2 | 10/2018 | Pandey et al. |
| 10,125,050 B2 | 11/2018 | Shah et al. |
| 10,125,492 B2 | 11/2018 | Tinianov |
| 10,132,076 B2 | 11/2018 | Tinianov |
| 10,144,824 B2 | 12/2018 | Li et al. |
| 10,150,700 B2 | 12/2018 | Wu et al. |
| 10,150,705 B2 | 12/2018 | Brock et al. |
| 10,150,867 B2 | 12/2018 | Yu et al. |
| 10,167,230 B1 | 1/2019 | Wambaugh et al. |
| 10,167,231 B1 | 1/2019 | Wambaugh et al. |
| 10,167,232 B1 | 1/2019 | Wambaugh et al. |
| 10,167,714 B2 | 1/2019 | Musso et al. |
| 10,174,499 B1 | 1/2019 | Tinianov et al. |
| 10,179,856 B2 | 1/2019 | Karrer et al. |
| 10,196,502 B2 | 2/2019 | Liu et al. |
| 10,202,536 B2 | 2/2019 | Pearl, Jr. et al. |
| 10,202,537 B1 | 2/2019 | Reddy |
| 10,202,820 B2 | 2/2019 | Xu et al. |
| 10,207,473 B2 | 2/2019 | Kato et al. |
| 10,221,097 B1 | 3/2019 | Al-Kutti et al. |
| 10,221,100 B2 | 3/2019 | Intorcia et al. |
| 10,221,685 B2 | 3/2019 | Bartetzko et al. |
| 10,227,259 B1 | 3/2019 | Wambaugh et al. |
| 10,259,949 B2 | 4/2019 | Kreh et al. |
| 10,266,700 B2 | 4/2019 | Bichler et al. |
| 10,266,754 B2 | 4/2019 | Nguyen et al. |
| 10,273,187 B2 | 4/2019 | Waters |
| 10,280,331 B2 | 5/2019 | Morea et al. |
| 10,355,278 B2 | 7/2019 | Yammine et al. |
| 10,759,697 B1 * | 9/2020 | Lukkarila ................. C04B 9/04 |
| 2006/0070321 A1 | 4/2006 | Au |
| 2006/0191223 A1 | 8/2006 | Bontrager, II |
| 2007/0017418 A1 * | 1/2007 | Dennis ................. C04B 40/065 |
| | | 106/685 |
| 2007/0245640 A1 | 10/2007 | Bergqvist |
| 2008/0178782 A1 | 7/2008 | Frobosilo et al. |
| 2011/0089386 A1 | 4/2011 | Berry et al. |
| 2012/0012029 A1 | 1/2012 | Vera |
| 2012/0110945 A1 | 5/2012 | Hoang et al. |
| 2012/0247043 A1 | 10/2012 | McDonald et al. |
| 2013/0115835 A1 | 5/2013 | Voit et al. |
| 2013/0196137 A1 | 8/2013 | Evans et al. |
| 2014/0106176 A1 | 4/2014 | Albert et al. |
| 2014/0127514 A1 | 5/2014 | Inoue et al. |
| 2014/0224406 A1 | 8/2014 | Nagy et al. |
| 2014/0318069 A1 | 10/2014 | Moennig et al. |
| 2014/0377489 A1 | 12/2014 | Kinzebach |
| 2015/0018464 A1 | 1/2015 | Bauer et al. |
| 2015/0204068 A1 | 7/2015 | Miller |
| 2015/0292202 A1 | 10/2015 | Tuttle et al. |
| 2015/0307735 A1 | 10/2015 | Morea et al. |
| 2015/0315083 A1 | 11/2015 | Deters et al. |
| 2015/0353737 A1 | 12/2015 | Siripurapu et al. |
| 2016/0061076 A1 | 3/2016 | Wolff |
| 2016/0075108 A1 | 3/2016 | Temblay |
| 2016/0088756 A1 | 3/2016 | Ramadas et al. |
| 2016/0153061 A1 | 6/2016 | Mizutani et al. |
| 2016/0159032 A1 | 6/2016 | Chu et al. |
| 2016/0160109 A1 | 6/2016 | Patil et al. |
| 2016/0160302 A1 | 6/2016 | Raclavsky |
| 2016/0207834 A1 | 7/2016 | Bullerjahn et al. |
| 2016/0222752 A1 | 8/2016 | Fripp et al. |
| 2016/0264461 A1 | 9/2016 | Peng et al. |
| 2016/0264462 A1 | 9/2016 | Soltanian et al. |
| 2016/0304396 A1 | 10/2016 | Shand et al. |
| 2016/0318803 A1 | 11/2016 | Pianaro et al. |
| 2016/0319103 A1 | 11/2016 | Wu et al. |
| 2016/0340247 A1 | 11/2016 | Hill et al. |
| 2016/0340254 A1 | 11/2016 | Edgar et al. |
| 2016/0340557 A1 | 11/2016 | Bai et al. |
| 2016/0369507 A1 | 12/2016 | Pervan et al. |
| 2017/0030647 A1 | 2/2017 | Hershey |
| 2017/0120564 A1 | 5/2017 | Schulte |
| 2017/0121223 A1 | 5/2017 | Atakan |
| 2017/0137546 A1 | 5/2017 | Thompson |
| 2017/0170441 A1 | 6/2017 | Arnold et al. |
| 2017/0174952 A1 | 6/2017 | Bess et al. |
| 2017/0210670 A1 | 7/2017 | Muthusamy et al. |
| 2017/0246760 A1 | 8/2017 | Colombo et al. |
| 2017/0268218 A1 | 9/2017 | Hilton |
| 2017/0268232 A1 | 9/2017 | Renke et al. |
| 2017/0282510 A1 | 10/2017 | Peet et al. |
| 2017/0283324 A1 | 10/2017 | Cui |
| 2017/0283565 A1 | 10/2017 | Ono et al. |
| 2017/0284093 A1 | 10/2017 | Lai et al. |
| 2017/0284095 A1 | 10/2017 | Collins et al. |
| 2017/0291222 A1 | 10/2017 | Khatiwada et al. |
| 2017/0297951 A1 | 10/2017 | Zhao et al. |
| 2017/0299198 A1 | 10/2017 | Collins et al. |
| 2017/0306625 A1 | 10/2017 | Collins et al. |
| 2017/0313909 A1 | 11/2017 | Luhmann et al. |
| 2017/0321001 A1 | 11/2017 | Deng et al. |
| 2017/0321026 A1 | 11/2017 | Sun et al. |
| 2017/0321105 A1 | 11/2017 | McDaniel et al. |
| 2017/0321418 A1 | 11/2017 | Tremblay |
| 2017/0322600 A1 | 11/2017 | Nguyen et al. |
| 2017/0334779 A1 | 11/2017 | Gong et al. |
| 2017/0334781 A1 | 11/2017 | Yang et al. |
| 2017/0349804 A1 | 12/2017 | Kellum et al. |

(56) References Cited

U.S. PATENT DOCUMENTS

| | | |
|---|---|---|
| 2017/0358803 A1 | 12/2017 | Li et al. |
| 2017/0362123 A1 | 12/2017 | Yammine et al. |
| 2017/0362740 A1 | 12/2017 | Gazquez et al. |
| 2018/0016174 A1 | 1/2018 | Demott et al. |
| 2018/0030267 A1 | 2/2018 | Liu et al. |
| 2018/0036911 A1 | 2/2018 | Dubey et al. |
| 2018/0037501 A1 | 2/2018 | Guynn et al. |
| 2018/0057911 A1 | 3/2018 | Chintinne et al. |
| 2018/0079691 A1 | 3/2018 | Donelan et al. |
| 2018/0093448 A1 | 4/2018 | Marskell |
| 2018/0094142 A1 | 4/2018 | Zhao et al. |
| 2018/0105465 A1 | 4/2018 | Waters |
| 2018/0105624 A1 | 4/2018 | Xu et al. |
| 2018/0112115 A1 | 4/2018 | Hamada |
| 2018/0127317 A1 | 5/2018 | Mayr et al. |
| 2018/0127537 A1 | 5/2018 | Liu |
| 2018/0141864 A1 | 5/2018 | Auvray et al. |
| 2018/0148378 A1 | 5/2018 | Mayr et al. |
| 2018/0170806 A1 | 6/2018 | Ben Haha et al. |
| 2018/0179372 A1 | 6/2018 | Ellul |
| 2018/0208509 A1 | 7/2018 | Terrasi et al. |
| 2018/0208510 A1 | 7/2018 | Espinosa et al. |
| 2018/0215989 A1 | 8/2018 | Jain |
| 2018/0230172 A1 | 8/2018 | Furukawa et al. |
| 2018/0230358 A1 | 8/2018 | Jain |
| 2018/0237597 A1 | 8/2018 | Chung et al. |
| 2018/0251986 A1 | 9/2018 | Taylor, Jr. et al. |
| 2018/0258206 A1 | 9/2018 | Dossi et al. |
| 2018/0265409 A1 | 9/2018 | Bugajski |
| 2018/0273430 A1 | 9/2018 | Tas et al. |
| 2018/0273729 A1 | 9/2018 | Matano |
| 2018/0282592 A1 | 10/2018 | Cura et al. |
| 2018/0290923 A1 | 10/2018 | Yu et al. |
| 2018/0291627 A1 | 10/2018 | Lee |
| 2018/0298265 A1 | 10/2018 | McDaniel et al. |
| 2018/0298600 A1 | 10/2018 | Moss et al. |
| 2018/0304604 A1 | 10/2018 | Fang et al. |
| 2018/0326480 A1 | 11/2018 | Opschoor et al. |
| 2018/0340104 A1 | 11/2018 | Hampson et al. |
| 2018/0355609 A1 | 12/2018 | Marusel et al. |
| 2018/0355619 A1 | 12/2018 | Neuman |
| 2018/0362406 A1 | 12/2018 | Meunier et al. |
| 2018/0362834 A1 | 12/2018 | Haghighi et al. |
| 2019/0002343 A1 | 1/2019 | Hargrove et al. |
| 2019/0009428 A1 | 1/2019 | Dienemann et al. |
| 2019/0010087 A1 | 1/2019 | Chun |
| 2019/0032332 A1 | 1/2019 | Collins et al. |
| 2019/0047173 A1 | 2/2019 | Schmidt |
| 2019/0062213 A1 | 2/2019 | Lewis et al. |
| 2019/0093352 A1 | 3/2019 | Orr |
| 2019/0099514 A1 | 4/2019 | Bezwada et al. |
| 2019/0100680 A1 | 4/2019 | Fathi et al. |
| 2019/0119161 A1 | 4/2019 | Kierat et al. |
| 2019/0128657 A1 | 5/2019 | Harrington et al. |
| 2019/0140579 A1 | 5/2019 | Wambaugh et al. |

FOREIGN PATENT DOCUMENTS

| | | | |
|---|---|---|---|
| CN | 102643073 | | 8/2012 |
| CN | 103626457 | | 3/2014 |
| CN | 104446063 | A * | 3/2015 |
| CN | 205637245 | | 10/2016 |
| CN | 106747240 | A * | 5/2017 |
| CN | 206917065 | | 1/2018 |
| CN | 104446063 | | 4/2018 |
| CN | 108358591 | A * | 8/2018 |
| EP | 1093032 | B1 | 8/2003 |
| EP | 1063206 | B1 | 10/2003 |
| EP | 1066942 | B1 | 11/2003 |
| EP | 1165719 | B1 | 11/2003 |
| EP | 1033354 | B1 | 1/2004 |
| EP | 1283196 | B1 | 4/2004 |
| EP | 1296013 | B1 | 10/2004 |
| EP | 1181259 | B1 | 12/2004 |
| EP | 1213270 | B1 | 2/2005 |
| EP | 1167428 | B1 | 4/2005 |
| EP | 1493830 | B1 | 8/2006 |
| EP | 1646593 | B1 | 11/2006 |
| EP | 1281692 | B1 | 10/2007 |
| EP | 1144340 | B1 | 7/2008 |
| EP | 1723089 | B1 | 5/2010 |
| EP | 2129635 | B1 | 6/2010 |
| EP | 2160367 | B1 | 9/2010 |
| EP | 2060640 | B1 | 5/2011 |
| EP | 1905946 | B1 | 2/2012 |
| EP | 1420000 | B1 | 10/2012 |
| EP | 2310436 | B1 | 12/2012 |
| EP | 2038239 | B1 | 1/2013 |
| EP | 1871720 | B1 | 12/2013 |
| EP | 2045227 | B1 | 8/2014 |
| EP | 2789594 | A1 | 10/2014 |
| EP | 2069255 | B1 | 12/2014 |
| EP | 2456928 | B1 | 9/2015 |
| EP | 2913440 | A1 | 9/2015 |
| EP | 2998334 | A1 | 3/2016 |
| EP | 2655289 | B1 | 4/2016 |
| EP | 2412688 | B1 | 5/2016 |
| EP | 2404885 | B1 | 7/2016 |
| EP | 2970011 | B1 | 12/2016 |
| EP | 3130571 | A1 | 2/2017 |
| EP | 2128872 | B1 | 7/2017 |
| EP | 3228608 | A1 | 10/2017 |
| EP | 1926692 | B1 | 9/2018 |
| EP | 3119850 | B1 | 9/2018 |
| EP | 2714616 | B1 | 10/2018 |
| EP | 3418346 | A1 | 12/2018 |
| EP | 3459918 | A1 | 3/2019 |
| JP | 2001-152585 | | 6/2001 |
| WO | WO 2016/084040 | | 6/2016 |
| WO | WO 2016/177979 | | 11/2016 |
| WO | WO 2018/014377 | | 1/2018 |
| WO | WO 2018/077468 | | 5/2018 |
| WO | WO 2018/086522 | | 5/2018 |
| WO | WO 2018/101728 | | 6/2018 |
| WO | WO 2018/107251 | | 6/2018 |
| WO | WO 2018/109037 | | 6/2018 |
| WO | WO 2018/136022 | | 7/2018 |
| WO | WO 2018/139975 | | 8/2018 |
| WO | WO 2018/140803 | | 8/2018 |
| WO | WO 2018/160253 | | 9/2018 |
| WO | WO 2018/175769 | | 9/2018 |
| WO | WO 2018/195599 | | 11/2018 |
| WO | WO 2018/208155 | | 11/2018 |
| WO | WO 2018/216932 | | 11/2018 |
| WO | WO 2019/009464 | | 1/2019 |
| WO | WO 2019/013390 | | 1/2019 |
| WO | WO 2019/053167 | | 3/2019 |
| WO | WO 2019/054950 | | 3/2019 |
| WO | WO 2019/076585 | | 4/2019 |
| WO | WO 2019/226607 | | 11/2019 |

OTHER PUBLICATIONS

Brichni, A et al., "Optimization of Magnesium Oxychloride Cement Formation Using Experimental Design Methodology," Journal of the Tunisian Chemical Society, vol. 18, pp. 114-120 (2016).

Brichni, A et al., "Optimization of Magnesium Oxychloride Cement Properties by Silica Glass," Advances in Cement Research (Sep. 2016).

Chandrawat, MPS et al., "Investigation of Blue Vitriol (Copper Sulphate Pentahydron) as an Admixture on the Properties of Magnesia Cement: an Eco-Friendly Approach," Rasayan J. Chem., vol. 1:4, pp. 914-919 (2008).

Chandrawat, MPS et al., "Effect of Aluminium Phosphate as Admixture on Oxychloride Cement," Bull. Mater. Sci., vol. 23:1, pp. 69-72 (Feb. 2000).

Deng, D, "The Mechanism for Soluble Phosphates to Improve the Water Resistance of Magnesium Oxychloride Cement," Cement and Concrete Research, vol. 33, pp. 1311-1317 (2003).

Du, C, "A Review of Magnesium Oxide in Concrete: A serendipitous discovery leads to new concrete for dam construction," Concrete International (Dec. 2005).

(56) References Cited

OTHER PUBLICATIONS

El-Mahllawy, MS et al., "The Influence of Aggregate Type on the Physico-Mechanical Properties of Magnesia Cement Pastes," Chemical Engineering Journal, vol. 1:1, pp. 4-10 (Jan. 2012).
Erlin, B et al, "Erlin & Hime on Concrete: The World As We Have Known It," Concrete Construction Magazine (Sep. 2005).
Florea, MVA et al, "Modelling of Chloride Binding Related to Hydration Products in Slag-Blended Cements," Construction and Building Materials, vol. 64, pp. 421-430 (2014).
Gapparova, KM et al., "Production of Waterproof Composite Magnesia Cement on the Basis of Local Mineral Resources," Modern Applied Science, vol. 9:3, pp. 309-315 (2015).
Gonçalves, T et al., "Hydration of Reactive MgO as Partial Cement Replacement and Its Influence on the Macroperformance of Cementitious Mortars," Hindawi—Advances in Materials Science and Engineering., vol. 2019, Article ID 9271507 (Feb. 2019).
Goodfellow Corporation, "Magnesia Magnesium Oxide (MgO) Properties & Applications" (Feb. 2001).
Jang, J-K et al, "The Evaluation of Damage Effects on MgO Added Concrete with Slag Cement Exposed to Calcium Chloride Deicing Salt," Materials, vol. 11:793 (May 2018).
Jin, F et al., "Effect of Different MgO on the Hydration of MgO-activated Granulated Ground Blastfurnace Slag Paste," Third International Conference on Sustainable Construction Materials and Technologies—Proceedings (Aug. 2013).
Jun, L et al., "Retardation and Reaction Mechanisms of Magnesium Phosphate Cement Mixed with Glacial Acetic Acid," RSC Adv., vol. 7, pp. 46852-46857 (2017).
Jurišová, J et al., "Characteristics of Sorel Cement Prepared from Impure Materials," Acta Chimica Slovaca (Dec. 2015).
Karimi, Y et al., "Investigations on the Properties of Magnesium Oxychloride Cement Produced by in situ and Classic Methods," International Journal of Metallurgical & Materials Science and Engineering, vol. 2:1, pp. 1-11 (2012).
Khan, S, "Hydrophobicity of Rare-earth Oxide Ceramics and their Application in Promoting Sustained Dropwise Condensation and Corrosion and Fouling Mitigation in Hydropower Systems" (Dec. 2015).
LightConcrete LLC, "High-Strength Structural Lightweight Concrete: A new direction towards advanced construction techniques using High-Strength Lightweight Cellular Concrete in the development of concrete in building and civil engineering construction—Specified Density Concrete" (2003).
Malinowski, S et al., "The Physical and Mechanical Properties of Magnesium Oxychloride Cement-Based Materials,"Budownictwo i Architektura, vol. 14:4, pp. 89-98 (2015).
Mathur, R et al., "Effects on Setting, Strength, Moisture Resistance and Linear Changes of Sorel's Cement on Mixing Portland Cement as an Additive," E-Journal of Chemistry, vol. 6(2), pp. 412-418 (2009).
Mathur, R et al., "Magnesium Oxysulphate Cement: Change in Properties on Admixing Sodium Bicarbonate as an Additive," Rasayan J. Chem, vol. 1(3), pp. 620-630 (2008).
Mousa, MI et al., "Physical properties of self-curing concrete (SCUC)," HBRC Journal, vol. 11, pp. 167-175 (2015).
Newman, ES et al., "Heat Generation in the Setting of Magnesium Oxychloride Cements," Journal of Research of the National Bureau of Standards, vol. 49:6, pp. 377-383 (Dec. 1952).
Ngally Sabouang, CJ et al., "Talc as Raw Material for Cementitious Products Formulation," Journal of Asian Ceramic Societies, vol. 2, pp. 263-267 (2014).
Nokken, M, "Expansion of MgO in Cement Pastes Measured by Different Methods," ACI Materials Journal (Feb. 2010).
Ordonez, E et al., "Hypervelocity Impact Testing of Materials for Additive Construction: Applications on Earth, the Moon, and Mars," NASA presentation (Aug. 2018).
Papas, SM, "Waterproof? Watertight? Water-Repellent?: Which is It?" Interface (Apr. 2013).
Peng, G-F et al., "Influence of Chloride-Ion Adsorption Agent on Chloride Ions in Concrete and Mortar," Materials, vol. 7, pp. 3415-3426 (2014).
Penghui W et al., "Degradation in Durability of Magnesium Oxychloride-Coated Reinforced Steel Concrete," ACI Materials Journal, vol. 117:2, pp. 33-42 (Mar. 2020).
Qiao, H et al., "The Application Review of Magnesium Oxychloride Cement," Journal of Chemical and Pharmaceutical Research, vol. 6:5, pp. 180-185 (2014).
Ring, TA et al., "Sorel Cement Reactions and their Kinetics," (Jan. 2007).
Rossiter, WJ et al., "Magnesium Oxychloride Cement-Based Foam Insulation: Review of Available Information and Identification of Research Needs," U.S. Department of Commerce National Bureau of Standards—Interim Report (Jun. 1986).
Rytwo, G et al., "Exchange Reactions in the Ca—Mg—Na-Montmorillonite System," Clays and Clay Materials, vol. 44:2, pp. 276-285 (1996).
Tatarczak, A et al., "Additives in Sorel Cement Based Materials—Impact Study," Proceedings of the International Conference on Civil, Structural and Transportation Engineering, Ottawa, Canada, Paper No. 318 (May 2015).
Walling, SA et al., "Magnesia-Based Cements: A Journey of 150 Years, and Cements for the Future?," American Chemical Society Chem. Rev., vol. 116, pp. 4170-4204 (Mar. 2016).
Weber, CO, "The Practical Application of Magnesia Cement," Scientific American Supplement, No. 802, pp. 12811-12813 (1891).
Wilson, MJ, "Clay Mineralogy and Shale Instability: An Alternative Conceptual Analysis," Clay Minerals, vol. 49, pp. 127-145 (2014).
Xing, S et al., "Preparation of Magnesium Phosphate Cement and Application in Concrete Repair," MATEC Web of Conferences, vol. 142 (2018).
Yadav, RN et al., "Effect of Temperature of Gauging Solution on Setting Characteristics and Moisture Ingress of Magnesium Oxychloride Cement—An Eco-Friendly Cement," J. Curr. Chem. Pharm. Sc., vol. 2:3, pp. 149-156 (2012).
Yang, N et al., "Properties of Magnesium Based Cements," The New Zealand Concrete Industry, Conference 2017 (Oct. 2017).
Ye, Q et al., "Tuning the Phase Structure and Mechanical Performance of Magnesium Oxychloride Cements by Curing Temperature and H2O/MgCl2 Ratio," Construction and Building Materials, vol. 179, pp. 413-419 (2018).
Yoon, JY et al., "Lightweight Concrete Produced Using a Two-Stage Casting Process," Materials, vol. 8, pp. 1384-1397 (2015).
Zhang, Y et al., "Green Cement a Step Closer to Being a Game-Changer for Construction Emissions," The Conversation (Nov. 2018).
Zhang, T et al., "Formation of Magnesium Silicate Hydrate (M—S—H) Cement Pastes Using Sodium Hexametaphosphate," Cement and Concrete Research, vol. 65, pp. 8-14 (2014).
Zhou, X et al., "Light-weight Wood-MOC Cement Composite Building Products Made by Extrusion" (2014).
Zimich, V, "Effect of Ferrous Additives on Magnesia Stone Hydration," IOP Conf. Series: Materials Science and Engineering, vol. 262 (2017).
U.S. Appl. No. 16/831,748 (U.S. Pat. No. 10,759,697), filed Mar. 26, 2020, Curable Formulations for Structural and Non-Structural Applications.
U.S. Appl. No. 17/006,426 (present application), filed Aug. 28, 2020, Curable Formulations for Structural and Non-Structural Applications.
PCT/US2020/036848 (PCT application), Jun. 9, 2020, Curable Formulations for Structural and Non-Structural Applications.
PCT/US2019/033237 (PCT application), May 21, 2019, Wall Assembly, Components, and Methods For Manufacture and Installation Thereof.

\* cited by examiner

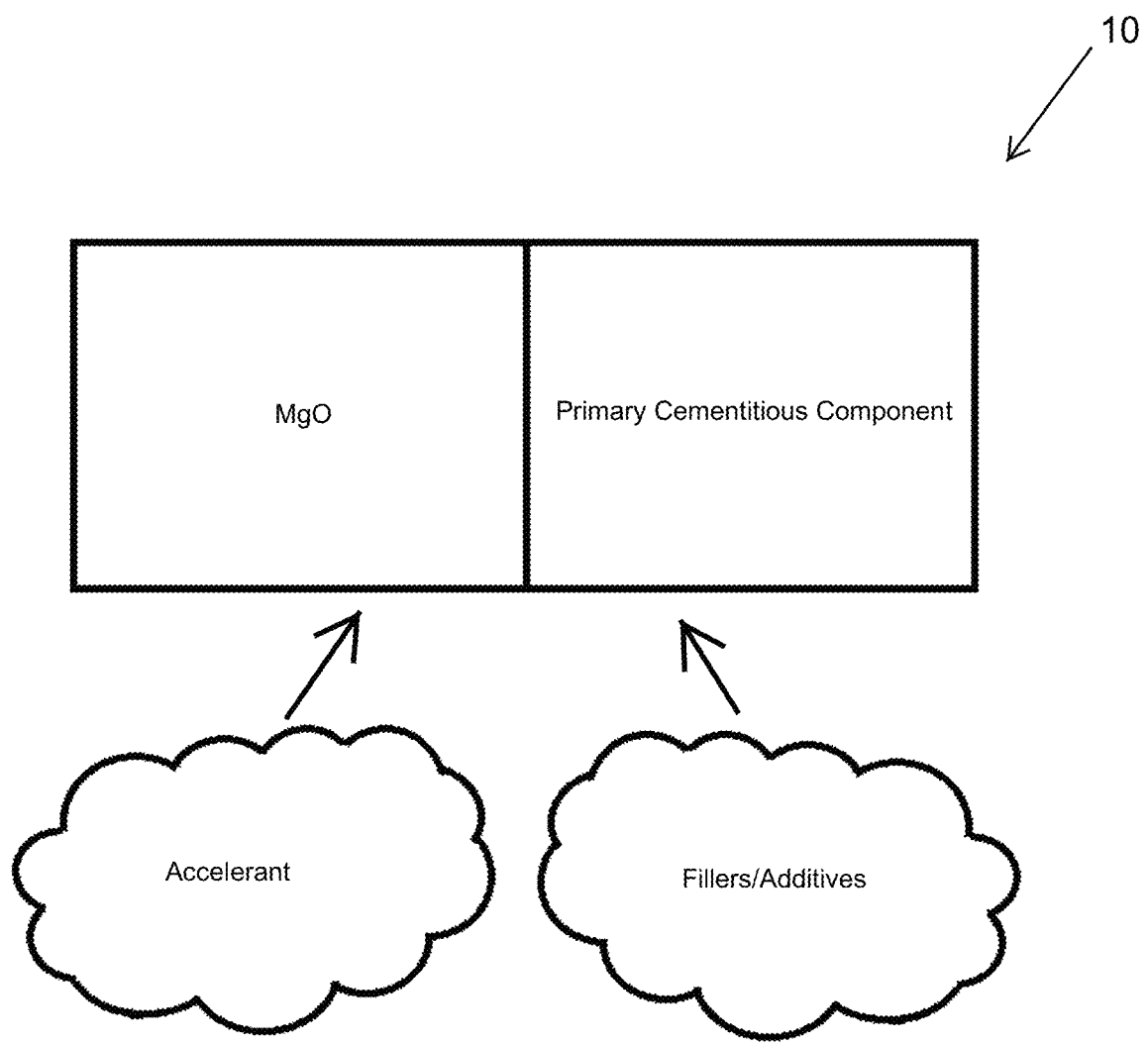

CURABLE FORMULATIONS FOR STRUCTURAL AND NON-STRUCTURAL APPLICATIONS

CROSS REFERENCE TO RELATED APPLICATIONS

This application is a continuation of U.S. application Ser. No. 16/831,748 filed Mar. 26, 2020, now U.S. Pat. No. 10,759,697, which claims priority to U.S. Provisional Application No. 62/859,741 filed Jun. 11, 2019, and U.S. Provisional Patent Application No. 62/938,307 filed Nov. 20, 2019. Further, this application claims priority directly to U.S. Provisional Patent Application No. 62/938,307 filed Nov. 20, 2019. The contents of all of the aforementioned applications are incorporated herein by reference in their entireties.

BACKGROUND

Field

This application relates generally to mixes that are configured to set and cure in the presence of water, and more specifically, to mixes comprising magnesium oxide that can be used as substitutes to Portland cement and other traditional cement formulations.

Description of the Related Art

Portland cement is the most common type of hydraulic binder used around the world as a key ingredient of concrete, mortar, grout and the like. As a result of its prevalence and because its primary raw material is limestone and comprises a relatively high carbon content, the manufacture and use of Portland cement is associated with serious environmental concerns. For example, the manufacture of Portland cement contributes significantly to the world carbon dioxide emissions. Further, the high energy consumption required to mine, manufacture, transport and/or otherwise handle Portland cement has additionally exacerbated environmental concerns. In addition, the use of Portland cement formulations is associated with other disadvantages, including, among other things, the dangers associated with handling, preparing and using such formulations, its exothermic output and associated potential for alkali burn injuries to workers and others who are exposed to it, and the like.

Although magnesium oxide (MgO) may be recognized as being capable of inclusion in certain hydraulic binders, the use of MgO in specific formulations that include slag, certain accelerators and/or other filler and additive materials is underappreciated. Prior attempts to use MgO cements have encountered numerous problems and other shortcomings, including, for example, difficulties in applications related to vertical and other structural build contexts (e.g., cracking, non-hydraulic performance, inability to use with steel and other metals, etc.). The present application discloses and claims various formulations that comprise MgO in combination with other materials to produce alterative curable formulations to Portland cement and/or other currently-known mixes (e.g., including mixes that may contain MgO) that provide reliable and sustainable alternatives for the construction industry and beyond.

SUMMARY

According to some embodiments, a curable mixture configured to set in the presence of water comprises magnesium oxide and a primary cementitious component (e.g., slag cement, Class C fly ash, etc.), wherein a proportion by weight of slag is 80% to 120% of a proportion of magnesium oxide by weight of the mixture, wherein a sum of the proportions of magnesium oxide and the primary cementitious component comprises at least 15% by weight of the mixture, wherein the mixture does not include Portland cement or gypsum, wherein the 7-day strength of the mixture once combined with water and permitted to cure is at least 2000 psi (e.g., at least 2000, 2100, 2200, 2300, 2400, 2500, 3000-3500, 3500-4000 psi, greater than 4000 psi, etc.), and wherein the 1-day strength of the mixture once combined with water and permitted to cure is at least 1000 psi (e.g., 1000, 1100, 1200, 1300, 1400, 1500, 1600, 1700, 1800, 1900, 2000, 2000-2500, 2500-3000, greater than 3000 psi, etc.). In some embodiments, the mixture does not include Portland cement or gypsum.

According to some embodiments, the primary cementitious component comprises one or both of slag cement and Class C fly ash.

According to some embodiments, the sum of the proportions of magnesium oxide and the primary cementitious component is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) by weight of the mixture, and wherein the proportion by weight of the primary cementitious component is 90% to 110% of the proportion of magnesium oxide by weight of the mixture.

According to some embodiments, the curable mixture comprises at least one accelerant, wherein the at least one accelerant comprises at least one of the following: magnesium chloride, magnesium nitrate, and magnesium sulfate.

According to some embodiments, a proportion by weight of the at least one accelerant is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture. In some embodiments, a final cured product resulting from combining the mixture with water is suitable for long-term contact with reinforcing bar, mesh, steel and other materials susceptible to corrosion. In some embodiments, a pH of the final cured product resulting from combining the mixture with water is greater than 8 (e.g., 8-9, 9-10, 10-11, 11-12, 12-13, 8-13, 9-12, pH values between the foregoing ranges, etc.).

According to some embodiments, the at least one accelerant comprises magnesium chloride in the form of $MgCl_2 \cdot 6H_2O$ or magnesium nitrate in the form of $Mg(NO_3)_2 \cdot 6H_2O$, wherein a proportion by weight of $MgCl_2 \cdot 6H_2O$ or $Mg(NO_3)_2 \cdot 6H_2O$ is 1% to 30% (e.g., 0%, 0%-30%, 0%-25%, 0%-20%, 0%45%, 0%40%, 0%-5%, 1%-30%, 1%-25%, 1%-20%, 1%45%, 1%-10%, 1%-5%, 2%-30%, 2%-25%, 2%45%, 2%42%, 2%40%, 2%-8%, 2%-6%, 2%-5%, 2%-4%, 2%-3%, 3%-30%, 3%, 25%, 3%, 15%, 3%42%, 3%40%, 3%-8%, 3%-6%, 3%-5%, 3%4%, 5%-30%, 5%-25%, 5%-20%, 5%45%, 5%42%, 5%-10%, 10%-30%, 10%-20%, 15%-25%, 15%-30%, values between the foregoing ranges, etc.) of the proportion of magnesium oxide by weight of the mixture. In some embodiments, the at least one accelerant further comprises magnesium sulfate in the form of $MgSO_4 \cdot 7H_2O$, wherein a proportion by weight of $MgSO_4 \cdot 7H_2O$ is 15% to 50% (e.g., 15%-50%, 15%-45%, 15-40%, 15%-35%, 20%-50%, 20%45%, 20%40%, 20%-35%, 25%-50%, 25%45%, 25%40%, 25%-

35%, 25%-30%, 30%-35%, values between the foregoing ranges, etc.) of the proportion of magnesium oxide by weight of the mixture.

According to some embodiments, the at least one accelerant does not comprise a phosphate-based material. In some embodiments, the at least one accelerant comprises a phosphate-based accelerant, wherein a proportion by weight of the phosphate-based accelerant is 0.1% to 5% of the proportion of magnesium oxide by weight of the mixture.

According to some embodiments, the curable mixture further comprises at least one accelerant, wherein the at least one accelerant comprises magnesium chloride in the form of $MgCl_2.6H_2O$ or magnesium nitrate in the form of $Mg(NO_3)_2.6H_2O$. In some embodiments, a proportion by weight of $MgCl_2.6H_2O$ or $Mg(NO_3)_2.6H_2O$ is 80% to 120% of the proportion of magnesium oxide by weight of the mixture.

According to some embodiments, the curable mixture further comprises at least one accelerant, wherein the at least one accelerant comprises magnesium sulfate in the form of $MgSO_4.7H_2O$. In some embodiments, a proportion by weight of $MgSO_4.7H_2O$ is 90% to 140% of the proportion of magnesium oxide by weight of the mixture.

According to some embodiments, the sum of the proportions of magnesium oxide and the primary cementitious component is 40% to 70% by weight of the mixture. In some embodiments, the proportion by weight of the primary cementitious component is 90% to 110% of the proportion of magnesium oxide by weight of the mixture.

According to some embodiments, the curable mixture further comprises at least one accelerant, wherein the at least one accelerant comprises at least one of the following: magnesium chloride, magnesium nitrate, magnesium sulfate and sodium hexametaphosphate.

According to some embodiments, a proportion by weight of the at least one accelerant is 15% to 50% of the proportion of magnesium oxide by weight of the mixture. In some embodiments, a proportion by weight of the at least one accelerant is 80% to 145% of the proportion of magnesium oxide by weight of the mixture.

According to some embodiments, the 7-day strength of the mixture once combined with water and permitted to cure is at least 3000 psi. In some embodiments, the 7-day strength of the mixture once combined with water and permitted to cure is at least 4000 psi.

According to some embodiments, the 1-day strength of the mixture once combined with water and permitted to cure is at least 1000 psi. In some embodiments, the 1-day strength of the mixture once combined with water and permitted to cure is at least 2000 psi.

According to some embodiments, the mixture further comprises at least one filler material or other additive, the at least one filler or other additive is selected from the following: pumice or other volcanic rock or material, sand, aggregate (e.g., fine aggregate, coarse aggregate, intermediate aggregate, other types of aggregate, etc.), talc, other clay material, fibers (e.g., steel and/or other metallic fibers, polypropylene and/or other polymeric fibers, glass fibers, asbestos fibers, carbon fibers, organic fibers, etc.), glass fiber reinforced plastic (GFRP), other reinforced polymers, admixtures or other additives that facilitate with fire protection, water protection, corrosion resistance/inhibition, workability, and/or one more other properties of the final cured product (e.g., MasterPel, RheoCell, MasterCell, etc.), sodium naphthalene sulfonate formaldehyde (SNF) and/or other surfactants, plasticizers, pigments, dyes and other color additives, titanium dioxide, other minerals, other natural or synthetic materials, other filler materials and/or the like.

According to some embodiments, a curable mixture configured to set in the presence of water comprises magnesium oxide, a primary cementitious component (e.g., slag cement, Class C fly ash, etc.), wherein a proportion by weight of the primary cementitious component is 80% to 120% of a proportion of magnesium oxide by weight of the mixture, and at least one accelerant, wherein the at least one accelerant comprises magnesium chloride in the form of $MgCl_2.6H_2O$ or magnesium nitrate in the form of $Mg(NO_3)_2.6H_2O$. In some embodiments, a proportion by weight of $MgCl_2.6H_2O$ or $Mg(NO_3)_2.6H_2O$ is 80% to 120% of the proportion of magnesium oxide by weight of the mixture. In some embodiments, the mixture does not include Portland cement or gypsum. In some embodiments, the 7-day strength of the mixture once combined with water and permitted to cure is at least 3000 psi. In some embodiments, the 1-day strength of the mixture once combined with water and permitted to cure is at least 1000 psi.

According to some embodiments, any of the curable mixes and formulations disclosed herein can include four different components. A curable mix or formulation 10 can comprise (i) magnesium oxide (MgO), (ii) a primary cementitious component, (iii) an accelerant, and (iv) fillers and/or other additives. Such mixes and formulations can be combined with water and/or other liquids and allowed to cure, thereby creating a cured final product (e.g., structure, slab, etc.).

According to some embodiments, the curable mix or formulation can include equal or substantially equal portions (by weight of the dry mix) of MgO and the primary cementitious component. As noted above, the primary cementitious component can comprise slag cement, Class C fly ash and/or any other material that has cementitious qualities (e.g., is configured to react with MgO and/or other components of the mix to form binder).

For any of the mix or formulation embodiments disclosed herein, the proportions of MgO and primary cementitious component (e.g., slag cement, Class C fly ash, etc.) in the formulation (e.g., the dry formulation before any water and/or other liquid is added) can be relatively equal to one another. For example, the proportion of the primary cementitious component by percentage of weight in the dry mix or formulation is 70% to 130% (e.g., 70%-130%, 80%-120%, 90%-110%, 95%-105%, 98%-102%, 99%-101%, values between the foregoing ranges, etc.) of the proportion of MgO by percentage of weight in the dry mix or formulation.

In some embodiments, the formulation or mix can comprise a combined MgO and primary cementitious component content, as a percentage by weight of the dry formulation or mix, that is 40% to 80% (e.g., 40%-80%, 40%-75%, 40%-70%, 40%-65%, 40%-60%, 40%-55%, 40%-50%, 40%45%, 45%-80%, 45%-75%, 45%-70%, 45%-65%, 45%-60%, 45%-55%, 45%-50%, 50%-80%, 50%-75%, 50%-70%, 50%-65%, 50%-60%, 50%-55%, 55%-80%, 55%-75%, 55%-70%, 55%-65%, 55%-60%, 60%-80%, 60%-75%, 60%-70%, 60%-65%, 65%-80%, 65%-75%, 65%-70%, 70%-80%, 70%-75%, 75-80%, percentages between the foregoing ranges, etc.).

In other arrangements, the formulation or mix can comprise a combined MgO and primary cementitious component content, as a percentage by weight of the dry formulation or mix, that is 10% to 50% (e.g., 10%-50%, 10%-45%, 10%-40%, 10%-35%, 10%-30%, 10%-25%, 10%-20%, 10%45%, 15%-50%, 15%45%, 15%40%, 15%-35%, 15%-30%, 15%-

25%, 15%-20%, 20%-50%, 20%45%, 20%40%, 20%-35%, 20%-30%, 20%-25%, 25%-50%, 25%-45%, 25%40%, 25%-35%, 25%-30%, 30%-50%, 30%45%, 30%40%, 30%-35%, 35%-50%, 35%-45%, 35%-40%, 40%-50%, 40%-45%, 45-50%, percentages between the foregoing ranges, etc.).

According to some embodiments, the sum of the proportions of magnesium oxide and primary cementitious component (e.g., slag cement, Class C fly ash) is 40% to 70% (e.g., 40%-70%, 50%-60%, 40%-60%, 40%-50%, 40%-45%, 45%-50%, 45%-55%, 45%-60%, 45%-65%, 45%-70%, 50%-55%, 50%-65%, 50%-70%, 55%-60%, 55%-65%, 55%-70%, 60%-65%, 60%-70%, other percentages between the foregoing ranges, etc.) by weight of the mixture.

According to some embodiments, as illustrated in the FIGURE, the curable mix or formulation 10 additionally comprises at least one accelerant. In some embodiments, the accelerant comprises at least one of the following: magnesium chloride, magnesium nitrate and magnesium sulfate. In some embodiments, a proportion by weight of the at least one accelerant is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture. In some embodiments, a final cured product resulting from combining the mixture with water is suitable for long-term contact with reinforcing bar, mesh, steel and other materials susceptible to corrosion.

For any of the embodiments disclosed herein, the mixture is designed to not include sodium hexametaphosphate. In some arrangements, the mixture does not include any sodium hexametaphosphate. In some embodiments, the mixture does not include any phosphate or other phosphorus-based material According to some embodiments, the at least one accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 2% to 30% (e.g., 2%-12%, 2%-10%, 2%-8%, 2%-6%, 2%-5%, 2%-4%, 2%-3%, 3%-12%, 3%-10%, 3%-8%, 3%-6%, 3%-5%, 3%-4%, 5%-12%, 5%-10%, 6%-10%, 6%-8%, values between the foregoing ranges, etc.) of the proportion of magnesium oxide by weight of the mixture, and the at least one accelerant further comprises magnesium sulfate in the form of $MgSO_4.7H_2O$, wherein a proportion by weight of $MgSO_4.7H_2O$ is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture.

According to some embodiments, the accelerant does not comprise a phosphate-based material. In some embodiments, the accelerant comprises a phosphate-based accelerant, wherein a proportion by weight of the phosphate-based accelerant is 0.1% to 5% (e.g., 0.1%-5%, 0.5%-5%, 1-5%, 1.5%-5%, 2%-5%, 2%-4.5%, 2%-4%, 2%-3.5%, 2.5%-5%, 2.5-4.5%, 2.5%-4%, 2.5%-3.5%, 2.5%-3%, 3%-3.5%, 3%-5%, 4%-5%, values between the foregoing ranges, etc.) of the proportion of magnesium oxide by weight of the mixture.

According to some embodiments, the accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of magnesium oxide by weight of the mixture.

According to some embodiments, the accelerant comprises magnesium sulfate in the form of $MgSO_4.7H_2O$, wherein a proportion by weight of $MgSO_4.7H_2O$ is 90% to 140% (e.g., 90%-140%, 90%-130%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, 105-130%, 105-140%, values between the foregoing ranges, etc.) of the proportion of magnesium oxide by weight of the mixture.

According to some embodiments, the curable mix or formulation 10 can additionally include one or more fillers and/or other additives. Possible fillers and/or other additives include, but are not limited to, non-cementitious slags (e.g., air-cooled slags), non-Class C fly ash (e.g., Class F fly ash), silica fume, nanosilica, fine silica glass, other silica-based materials, waste glass, ground glass, other glass-containing materials, post-consumer materials, other waste materials, fine aggregate, intermediate aggregate, coarse aggregate, other types of aggregate, pumice or other volcanic rock or material, sand, talc, other clay material, fibers (e.g., steel and/or other metallic fibers, polypropylene and/or other polymeric fibers, glass fibers, asbestos fibers, carbon fibers, organic fibers, etc.), glass fiber reinforced plastic (GFRP), other reinforced polymers, admixtures or other additives that facilitate with fire protection, water protection, corrosion resistance/inhibition, workability, and/or one more other properties of the final cured product (e.g., MasterPel, RheoCell, MasterCell, etc.), sodium naphthalene sulfonate formaldehyde (SNF) and/or other surfactants, plasticizers, pigments, dyes and other color additives, titanium dioxide, other minerals, other natural or synthetic materials, other filler materials and/or the like.

In some embodiments, the fillers and/or other additives are included to react with the other components of the mix and/or to provide some beneficial characteristic or property to the resulting paste (e.g., once the mix is combined with water) and/or the final cured product. For example, in some embodiments, such materials (e.g., air-cooled slags, other non-cementitious slags, Class F fly ash, other non-cementitious fly ash, pozzolan, silica fume, etc.) can act to reduce the permeability of the resulting paste or cured product. In some embodiments, such materials help plug or otherwise fill holes or other cavities in the resulting paste and cured product. According to some arrangements, mixes or formulations that include materials that provide one or more benefits or other advantages to the resulting paste or cured product can be referred to as ternary mixes. In some embodiments, the non-cementitious components included in a ternary mix satisfy the requirements of ASTM C595.

In some embodiments, fillers and/or other additives are included to provide one or more other benefits and advantages, either in addition to or in lieu of reducing permeability. For instance, one or more additives listed above can facilitate with fire protection, water protection, corrosion resistance/inhibition, workability, and/or one more other properties of the final cured product.

In some embodiments, fillers such as aggregate (e.g., coarse aggregate, intermediate aggregate, fine aggregate, etc.), clay, pumice or other volcanic rock or material, sand, talc, other clay material, etc. are there merely as fillers. Such materials can provide the mix and the resulting paste and cured product with the desired or required density and structural properties.

According to some embodiments, the dry mixes or formulations disclosed herein do not contain Portland Cement and/or gypsum. In some embodiments, the pH of the mix (e.g., dry mix) and/or the resulting paste and cured product is 8 to 11 (e.g., 8-11, 8-10, 8-9, 9-11, 9-10, 8.5, 9.5, 8-9.5, 8.5-11. 8.5-10, ranges between the foregoing values, etc.). In some arrangements, the pH of the mix (e.g., dry mix) and/or the resulting paste and cured product is 10 or above (e.g., 10, 11, 12, 13, 10 to 11, 11 to 12, 12 to 13, above 13, 10 to 14, 10 to 13, 10 to 12, 11 to 14, 11 to 13, 12 to 14, pH values between the foregoing ranges or values, etc.). Thus, in some embodiments, the mixes are suitable to be used for applications that include rebar or other types of reinforcing metals.

According to some embodiments, one or more characteristics or properties (e.g., structural, physical, etc.) of the paste or cured product resulting from using the various mixes and formulations disclosed herein are similar (and/or even better or more preferred) than corresponding characteristics or properties of cured Portland cement mixes and formulations. For example, a curable paste that results from combining any of the mixtures disclosed herein with water comprises a density that is equal or substantially equal to the density of Portland cement pastes. In some embodiments, the density of the curable paste is 80% to 120% of the density of Portland cement pastes.

Further, according to some embodiments, a curable paste that results from combining any of the mixtures disclosed herein with water comprises a rate of leaching that is equal to substantially equal to a rate of leaching of Portland cement pastes. In some embodiments, the rate of leaching of the curable paste is 80% to 120% of the rate of leaching of Portland cement pastes.

In addition, according to some embodiments, a curable paste that results from combining any of the mixtures disclosed herein with water comprises a Poisson's Ratio that is equal to substantially equal to Poisson's Ratio of Portland cement pastes. In some embodiments, the Poisson's Ratio of the curable paste is 70% to 150% (e.g., 70%-150%, 70%-140%, 70%-130%, 70%-120%, 70%-110%, 70%-100%, 70%-90%, 70%-80%, 80%-150%, 80%-140%, 80%-130%, 80%-120%, 80%-110%, 80%-100%, 80%-90%, 90%-150%, 90%-140%, 90%-130%, 90%-120%, 90%-110%, 90%-100%, 100%-150%, 100%-140%, 100%-130%, 100%-120%, 100%-110%, 110%-150%, 110%-140%, 110%-130%, 110%-120%, 120%-150%, 120%-140%, 120%-130%, 130%-150%, 130%-140%, 140%-150%, 95%-105%, 85%-115%, 75%-125%, percentages between the foregoing ranges, etc.) of the Poisson's ratio of Portland cement pastes. In some embodiments, the Poission's Ratio of a curable paste that results from combining any of the mixtures disclosed herein with water is 0.15 to 0.30 (e.g., 0.15, 0.16, 0.17, 0.18, 0.19, 0.20, 0.21, 0.22, 0.23, 0.24, 0.25, 0.15-0.25, 0.15-0.20, 0.25-0.30, 0.20-0.25, 0.20-0.27, 0.20-0.30, values between the foregoing values and ranges, etc.).

Also, according to some embodiments, a curable paste that results from combining any of the mixtures disclosed herein with water comprises a modulus of elasticity that is equal to substantially equal to the modulus of elasticity of Portland cement pastes. According to some embodiments, a curable paste that results from combining any of the mixtures disclosed herein with water comprises a modulus of elasticity that is equal to substantially equal to the modulus of elasticity of Portland cement pastes. In some embodiments, the modulus of elasticity of the curable paste is 50% to 200% (e.g., 50-200, 50-190, 50-180, 50-170, 50-160, 50-150, 50-140, 50-130, 50-120, 50-110, 50-100, 50-90, 50-80, 50-70, 50-60, 60-200, 60-190, 60-180, 60-170, 60-160, 60-150, 60-140, 60-130, 60-120, 60-110, 60-100, 60-90, 60-80, 60-70, 70-200, 70-190, 70-180, 70-170, 70-160, 70-150, 70-140, 70-130, 70-120, 70-110, 70-100, 70-90, 70-80, 80-200, 80-190, 80-180, 80-170, 80-160, 80-150, 80-140, 80-130, 80-120, 80-110, 80-100, 80-90, 90-200, 90-190, 90-180, 90-170, 90-160, 90-150, 90-140, 90-130, 90-120, 90-110, 90-100, 100-200, 100-190, 100-180, 100-170, 100-160, 100-150, 100-140, 100-130, 100-120, 100-110, 110-200, 110-190, 110-180, 110-170, 110-160, 110-150, 110-140, 110-130, 110-120, 120-200, 120-190, 120-180, 120-170, 120-160, 120-150, 120-140, 120-130, 130-200, 130-190, 130-180, 130-170, 130-160, 130-150, 130-140, 140-200, 140-190, 140-180, 140-170, 140-160, 140-150, 150-200, 150-190, 150-180, 150-170, 150-160, 160-200, 160-190, 160-180, 160-170, 170-200, 170-190, 170-180, 180-200, 180-190, 190-200, 95-105, 85-115, 75-125, 65-135, 55-145, values between the foregoing values and ranges, etc.) of the modulus of elasticity of Portland cement pastes. In some embodiments, the modulus of elasticity of a curable paste that results from combining any of the mixtures disclosed herein with water is $3(10^6)$ to $5(10^6)$ (e.g., $3(10^6)$ to $5(10^6)$, $3.0(10^6)$ to $3.5(10^6)$, $3.5(10^6)$ to $4.0(10^6)$, $4.0(10^6)$ to $4.5(10^6)$, $4.5(10^6)$ to $5.0(10^6)$, $3(10^6)$ to $4(10^6)$, $3.0(10^6)$ to $4.5(10^6)$, $3.5(10^6)$ to $5.0(10^6)$, $3.5(10^6)$ to $4.5(10^6)$, $3.0(10^6)$, $3.1(10^6)$, $3.2(10^6)$, $3.3(10^6)$, $3.4(10^6)$, $3.5(10^6)$, $3.6(10^6)$, $3.7(10^6)$, $3.8(10^6)$, $3.9(10^6)$, $4.0(10^6)$, $4.1(10^6)$, $4.2(10^6)$, $4.3(10^6)$, $4.4(10^6)$, $4.5(10^6)$, $4.6(10^6)$, $4.7(10^6)$, $4.8(10^6)$, $4.9(10^6)$, $5.0(10^6)$ psi, values between the foregoing values and ranges, etc.) psi.

As noted herein, the formulations or mixes disclosed herein, or equivalents thereof, can be used in one or more of the following non-limiting applications, industries and/or contexts: building construction both residential and commercial (e.g., used in columns, beams and other load-bearing members), walls and other construction panels (e.g., including non-load bearing members), airports, dams, levees, bridges, tunnels, harbors, refineries and other industrial sites, parking structures, roadways, tile and other flooring, sidewalks, pipes, channels, countertops and/or the like. Depending on final cured product's ability to not damage steel or other metals, one or more of formulations or mixes are suitable for use in applications tensile reinforcement is desired or required (e.g., to prevent or reduce the likelihood of cracking, breaking and/or other compromising occurrence to the cured product).

According to some embodiments, the 7-day strength of the mixture once combined with water and permitted to cure is at least 2000 psi (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4500, 5000, 5500 psi, greater than 5500 psi, etc.). In some arrangements, the 1-day strength of the mixture once combined with water and permitted to cure is at least 1000 psi (e.g., 1000, 1100, 1200, 1300, 1400, 1500, 1600, 1700, 1800, 1900, 2000, 2500, 3000, 3500, 4000, 4500, psi, greater than 4500 psi, etc.).

According to some embodiments, a curable mixture configured to set in the presence of water, wherein the mixture comprises magnesium oxide, a primary cementitious component (e.g., slag cement, Class C fly ash) and at least one accelerant. A proportion by weight of slag is 80% to 120% of a proportion of magnesium oxide by weight of the mixture.

According to some embodiments, a curable mixture configured to set in the presence of water comprises magnesium oxide and slag, wherein a proportion by weight of a primary cementitious component (e.g., slag cement, Class C fly ash, etc.) is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of a proportion of magnesium oxide by weight of the mixture, wherein a sum of the proportions of magnesium oxide and the primary cementitious component comprises at least 40% (e.g., at least 40%, 45%, 50%, 55%, 60%, 65%, greater than 65%, etc.) by weight of the mixture, wherein the 7-day strength of the mixture once combined with water and permitted to cure is at least 2000 psi (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4500, 5000, 5500 psi, greater than 5500 psi, etc.), and wherein the 1-day strength of the mixture once combined with water and permitted to cure is at least 1000 psi (e.g., 1000, 1100, 1200, 1300, 1400, 1500, 1600, 1700, 1800, 1900, 2000, 2500, 3000, 3500, 4000, 4500, psi, greater than 4500 psi, etc.). In some embodiments, the mixture does not include Portland cement. In some embodiments, the mixture does not include Portland cement or gypsum.

According to some embodiments, the sum of the proportions of magnesium oxide and primary cementitious component is 35% to 70% (e.g., 35%-70%, 35%-40%, 35%-45%, 35%-50%, 35%-55%, 35%-60%, 35%-65%, 40%-70%, 50%-60%, 40%-60%, 40%-50%, 40%-45%, 45%-50%, 45%-55%, 45%-60%, 45%-65%, 45%-70%, 50%-55%, 50%-65%, 50%-70%, 55%-60%, 55%-65%, 55%-70%, 60%-65%, 60%-70%, other percentages between the foregoing ranges, etc.) by weight of the mixture, and wherein the proportion by weight of slag is 95% to 105% (e.g., 95%, 96%, 97%, 98%, 99%, 100%, 101%, 102%, 103%, 104%, 105%, 95%-105%, 96%-104%, 97%-103%, 98%-102%, 99%-101%, other percentages between the foregoing ranges, etc.) of the proportion of magnesium oxide by weight of the mixture.

According to some embodiments, the mixture additionally comprises at least one accelerant, wherein the at least one accelerant comprises at least one of the following: magnesium chloride, magnesium nitrate, magnesium sulfate and sodium hexametaphosphate. In some embodiments, a proportion by weight of the at least one accelerant is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture. In some embodiments, a final cured product resulting from combining the mixture with water is suitable for long-term contact with reinforcing bar, mesh, steel and other materials susceptible to corrosion.

For any of the embodiments disclosed herein, the mixture is designed to not include sodium hexametaphosphate. In some arrangements, the mixture does not include any sodium hexametaphosphate. In some embodiments, the mixture does not include any phosphate or phosphorus-based material.

According to some embodiments, the at least one accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 2% to 30% (e.g., 2%-12%, 2%-10%, 2%-8%, 2%-6%, 2%-5%, 2%-4%, 2%-3%, 3%-12%, 3%-10%, 3%-8%, 3%-6%, 3%-5%, 3%-4%, 5%-12%, 5%-10%, 6%-10%, 6%-8%, values between the foregoing ranges, etc.) of the proportion of magnesium oxide by weight of the mixture, and the at least one accelerant further comprises magnesium sulfate in the form of $MgSO_4.7H_2O$, wherein a proportion by weight of $MgSO_4.7H_2O$ is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture.

According to some embodiments, the at least one accelerant does not comprise a phosphate-based material. In some embodiments, the at least one accelerant comprises a phosphate-based accelerant, wherein a proportion by weight of the phosphate-based accelerant is 0.1% to 5% (e.g., 0.1%-5%, 0.5%-5%, 1-5%, 1.5%-5%, 2%-5%, 2%-4.5%, 2%-4%, 2%-3.5%, 2.5%-5%, 2.5-4.5%, 2.5%-4%, 2.5%-3.5%, 2.5%-3%, 3%-3.5%, 3%-5%, 4%-5%, values between the foregoing ranges, etc.) of the proportion of magnesium oxide by weight of the mixture.

According to some embodiments, the mixture additionally comprises at least one accelerant, wherein the at least one accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of magnesium oxide by weight of the mixture.

According to some embodiments, the mixture further comprises at least one accelerant, wherein the at least one accelerant comprises magnesium sulfate in the form of $MgSO_4.7H_2O$, wherein a proportion by weight of $MgSO_4.7H_2O$ is 90% to 140% (e.g., 90%-140%, 90%-130%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, 105-130%, 105-140%, values between the foregoing ranges, etc.) of the proportion of magnesium oxide by weight of the mixture.

According to some embodiments, the sum of the proportions of magnesium oxide and slag is 40% to 70% (e.g., 40%-70%, 50%-60%, 40%-60%, 40%-50%, 40%-45%, 45%-50%, 45%-55%, 45%-60%, 45%-65%, 45%-70%, 50%-55%, 50%-65%, 50%-70%, 55%-60%, 55%-65%, 55%-70%, 60%-65%, 60%-70%, other percentages between the foregoing ranges, etc.) by weight of the mixture.

According to some embodiments, the proportion by weight of the primary cementitious component (e.g., slag cement, Class C fly ash) is 95% to 105% (e.g., 95%, 96%, 97%, 98%, 99%, 100%, 101%, 102%, 103%, 104%, 105%, 95%-105%, 96%-104%, 97%-103%, 98%-102%, 99%-101%, other percentages between the foregoing ranges, etc.) of the proportion of magnesium oxide by weight of the mixture.

According to some embodiments, the mixture further comprises at least one accelerant, wherein the at least one accelerant comprises at least one of the following: magnesium chloride, magnesium nitrate, magnesium sulfate and sodium hexametaphosphate.

According to some embodiments, a proportion by weight of the at least one accelerant is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture.

According to some embodiments, a proportion by weight of the at least one accelerant is 80% to 145% (e.g., 80%-145%, 80%-140%, 80%-130%, 80%-120%, 80%-110%, 85%-145%, 85%-140%, 85%-130%, 85%-120%, 85%-110%, 90%-145%, 90%-140%, 90%-130%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, 105-130%, 105-140%, 105%-145%, values between the foregoing ranges, etc.) of the proportion of magnesium oxide by weight of the mixture.

According to some embodiments, 7-day strength of the mixture once combined with water and permitted to cure is at least 3000, 3100, 3200, 3300, 3400, 3500, 4000, 4500, 5000 psi, values between the foregoing, greater than 5000 psi, etc.).

According to some embodiments, 1-day strength of the mixture once combined with water and permitted to cure is at least 1000, 1100, 1200, 1300, 1400, 1500, 2000, 2500, 3000, 3500, 4000 psi, values between the foregoing, greater than 4000 psi, etc.).

According to some embodiments, the mixture further comprises at least one filler material or other additive, the at least one filler or other additive is selected from the following: pumice or other volcanic rock or material, sand, aggregate (e.g., fine aggregate, coarse aggregate, intermediate aggregate, other types of aggregate, etc.), talc, other clay material, fibers (e.g., steel and/or other metallic fibers, polypropylene and/or other polymeric fibers, glass fibers, asbestos fibers, carbon fibers, organic fibers, etc.), glass fiber reinforced plastic (GFRP), other reinforced polymers, admixtures or other additives that facilitate with fire protection, water protection, corrosion resistance/inhibition, workability, and/or one more other properties of the final cured product (e.g., MasterPel, RheoCell, MasterCell, etc.), sodium naphthalene sulfonate formaldehyde (SNF) and/or other surfactants, plasticizers, pigments, dyes and other color additives, titanium dioxide, other minerals, other natural or synthetic materials, other filler materials and/or the like.

According to some embodiments, a curable mixture configured to set in the presence of water comprises magnesium oxide, a primary cementitious component (e.g., slag cement, Class C fly ash), wherein a proportion by weight of slag is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of a proportion of magnesium oxide by weight of the mixture, and at least one accelerant, wherein the at least one accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of magnesium oxide by weight of the mixture. In some embodiments, the mixture does not comprise Portland cement. In some embodiments, the mixture does not comprise Portland cement or gypsum. In some embodiments, the mixture does not comprise gypsum as an initial mixture ingredient. For example, in some embodiments, although the dry mixture does not include gypsum, gypsum in some final or intermediate form may be created after the dry mixture is combined with water (e.g., during after curing). In some embodiments, the 7-day strength of the mixture once combined with water and permitted to cure is at least 3000 psi (e.g., 3000, 3100, 3200, 3300, 3400, 3500, 3600, 3700, 3800, 3900, 4000, 4500, 5000, 5500 psi, greater than 5500 psi, etc.), and the 1-day strength of the mixture once combined with water and permitted to cure is at least 1000 psi (e.g., 1000, 1100, 1200, 1300, 1400, 1500, 1600, 1700, 1800, 1900, 2000, 2500, 3000, 3500, 4000, 4500, psi, greater than 4500 psi, etc.).

According to some embodiments, a curable mixture configured to set in the presence of water comprises magnesium oxide and slag, wherein a proportion by weight of the primary cementitious component (e.g., slag cement, Class C fly ash) is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of a proportion of magnesium oxide by weight of the mixture. In some embodiments, the mixture additionally comprises at least one accelerant, wherein the at least one accelerant comprises magnesium sulfate in the form of $MgSO_4.7H_2O$, wherein a proportion by weight of $MgSO_4.7H_2O$ is 90% to 140% (e.g., 90%-140%, 90%-130%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, 105-130%, 105-140%, values between the foregoing ranges, etc.) of the proportion of magnesium oxide by weight of the mixture. In some embodiments, the mixture does not comprise Portland cement. In some embodiments, the mixture does not comprise Portland cement or gypsum. In some embodiments, the 7-day strength of the mixture once combined with water and permitted to cure is at least 3000 psi (e.g., 3000, 3100, 3200, 3300, 3400, 3500, 3600, 3700, 3800, 3900, 4000, 4500, 5000, 5500 psi, greater than 5500 psi, etc.), and the 1-day strength of the mixture once combined with water and permitted to cure is at least 1000 psi (e.g., 1000, 1100, 1200, 1300, 1400, 1500, 1600, 1700, 1800, 1900, 2000, 2500, 3000, 3500, 4000, 4500, psi, greater than 4500 psi, etc.).

According to some embodiments, a curable mixture configured to set in the presence of water comprises magnesium oxide and the primary cementitious component (e.g., slag cement, Class C fly ash), wherein a proportion by weight of slag is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of a proportion of magnesium oxide by weight of the mixture. The mixture additionally comprises at least one accelerant, wherein the at least one accelerant comprises (i) magnesium chloride in the form of $MgCl_2.6H_2O$ or magnesium nitrate in the form of $Mg(NO_3)_2.6H_2O$, and (ii) magnesium sulfate in the form of $MgSO_4.7H_2O$. The proportion by weight of $MgCl_2.6H_2O$ or $Mg(NO_3)_2.6H_2O$ is 2% to 12% (e.g., 2%-12%, 2%-10%, 2%-8%, 2%-6%, 2%-5%, 2%-4%, 2%-3%, 3%-12%, 3%-10%, 3%-8%, 3%-6%, 3%-5%, 3%-4%, 4%-12%, 4%-10%, 4%-8%, 4%-6%, 4%-5%, 5%-12%, 5%-10%, 5%-8%, 5%-6%, 6%-12%, 6%-10%, 6%-8%, 8%-12%, 8%-10%, 10%-12%, values between the foregoing ranges, etc.) of the proportion of magnesium oxide by weight of the mixture, and the proportion by weight of $MgSO_4.7H_2O$ is 15% to 35% (e.g., 15%-35%, 15%-30%, 15-25%, 15%-20%, 20%-35%, 20%-30%, 20%-25%, 25%-35%, 25%-30%, 30%-35%, values between the foregoing ranges, etc.) of the proportion of magnesium oxide by weight of the mixture. In some embodiments, a final cured product resulting from combining the mixture with water is suitable for long-term contact with reinforcing bar, mesh, steel and other materials susceptible to corrosion. In some embodiments, the 7-day strength of the mixture once combined with water and permitted to cure is at least 3000 psi (e.g., 3000, 3100, 3200, 3300, 3400, 3500, 3600, 3700, 3800, 3900, 4000, 4500, 5000, 5500 psi, greater than 5500 psi, etc.), and the 1-day strength of the mixture once combined with water and permitted to cure is at least 1000 psi (e.g., 1000, 1100, 1200, 1300, 1400, 1500, 1600, 1700, 1800, 1900, 2000, 2500, 3000, 3500, 4000, 4500, psi, greater than 4500 psi, etc.).

According to some embodiments, a curable mixture configured to set in the presence of water comprises magnesium oxide and slag, wherein a proportion by weight of the primary cementitious component (e.g., slag cement, Class C fly ash) is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of a proportion of magnesium oxide by weight of the mixture. The mixture additionally comprises at least one accelerant, wherein the at least one accelerant comprises (i) magnesium chloride in the form of $MgCl_2.6H_2O$ or magnesium nitrate in the form of $Mg(NO_3)_2.6H_2O$, and (ii) magnesium sulfate in the form of $MgSO_4.7H_2O$. In some embodiments, a proportion by weight of $MgCl_2.6H_2O$ or $Mg(NO_3)_2.6H_2O$ is 2% to 30% (e.g., 2%-12%, 2%-10%, 2%-8%, 2%-6%, 2%-5%, 2%-4%, 2%-3%, 3%-12%, 3%-10%, 3%-8%, 3%-6%, 3%-5%, 3%-4%, 5%-12%, 5%-10%, 6%-10%, 6%-8%, values between the foregoing ranges, etc.) of the proportion of magnesium oxide by weight of the mixture, and a proportion by weight of $MgSO_4.7H_2O$ is 15% to 50% 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture. In some embodiments, the 7-day strength of the mixture once combined with water and permitted to cure is at least 3000 psi (e.g., 3000, 3100, 3200, 3300, 3400, 3500, 3600, 3700, 3800, 3900, 4000, 4500, 5000, 5500 psi, greater than 5500 psi, etc.), and the 1-day strength of the mixture once combined with water and permitted to cure is at least 1000 psi (e.g., 1000, 1100, 1200, 1300, 1400, 1500, 1600, 1700, 1800, 1900, 2000, 2500, 3000, 3500, 4000, 4500, psi, greater than 4500 psi, etc.). In some embodiments, the mixture further comprises at least one additional accelerant, wherein the at least one additional accelerant comprises sodium hexametaphosphate. In some embodiments, a proportion of sodium hexametaphosphate is 0.1% to 5% (e.g., 0.1%-5%, 0.5%-5%, 1-5%, 1.5%-5%, 2%-5%, 2%-4.5%, 2%-4%, 2%-3.5%, 2.5%-5%, 2.5-4.5%, 2.5%-4%, 2.5%-3.5%, 2.5%-3%, 3%-3.5%, 3%-5%, 4%-5%, values between the foregoing ranges, etc.) of the proportion of magnesium oxide by weight of the mixture.

According to some embodiments, 7-day strength of the mixture once combined with water and permitted to cure is at least 3000, 3100, 3200, 3300, 3400, 3500, 4000, 4500, 5000 psi, values between the foregoing, greater than 5000 psi, etc.).

According to some embodiments, 1-day strength of the mixture once combined with water and permitted to cure is at least 1000, 1100, 1200, 1300, 1400, 1500, 2000, 2500, 3000, 3500, 4000 psi, values between the foregoing, greater than 4000 psi, etc.).

According to some embodiments, the mixture further comprises at least one filler material or other additive, the at least one filler or other additive is selected from the following: pumice or other volcanic rock or material, sand, aggregate (e.g., fine aggregate, coarse aggregate, intermediate aggregate, other types of aggregate, etc.), talc, other clay material, fibers (e.g., steel and/or other metallic fibers, polypropylene and/or other polymeric fibers, glass fibers, asbestos fibers, carbon fibers, organic fibers, etc.), glass fiber reinforced plastic (GFRP), other reinforced polymers, admixtures or other additives that facilitate with fire protection, water protection, corrosion resistance/inhibition, workability, and/or one more other properties of the final cured product (e.g., MasterPel, RheoCell, MasterCell, etc.), sodium naphthalene sulfonate formaldehyde (SNF) and/or other surfactants, plasticizers, pigments, dyes and other color additives, titanium dioxide, other minerals, other natural or synthetic materials, other filler materials and/or the like.

According to some embodiments, a curable mixture configured to set in the presence of water comprises magnesium oxide and the primary cementitious component (e.g., slag cement, fly ash) wherein a proportion by weight of the primary cementitious component (e.g., slag cement, Class C fly ash) is 80% to 120% of a proportion of magnesium oxide by weight of the mixture, wherein a sum of the proportions of magnesium oxide and the primary cementitious component (e.g., slag cement comprises at least 35% by weight of the mixture, wherein the mixture does not include Portland cement or gypsum, wherein the sum of the proportions of magnesium oxide and the primary cementitious component (e.g., slag cement, Class C fly ash) is 40% to 70% by weight of the mixture. The curable mixture further includes at least one accelerant, wherein the at least one accelerant comprises at least one of the following: magnesium chloride, magnesium nitrate, and magnesium sulfate, wherein a proportion by weight of the at least one accelerant is 5% to 45% of the proportion of magnesium oxide by weight of the mixture. A final cured product resulting from combining the mixture with water is suitable for long-term contact with reinforcing bar, mesh, steel and other materials susceptible to corrosion.

According to some embodiments, a pH of any of the mixtures disclosed herein, after being combined with water, is 8 to 11 (e.g., 8-11, 8-10, 8-9, 9-11, 9-10, 8.5, 9.5, 8-9.5, 8.5-11. 8.5-10, ranges between the foregoing values, etc.). According to some embodiments, a pH of any of the mixtures disclosed herein, after being combined with water, is greater than 10 (e.g., 10-11, 11-12, 12-13, 10, 11, 12, 13, greater than 13, pH values between the foregoing values and ranges, etc.).

According to some embodiments, any of the mixtures disclosed herein do not contain SHMP or any other phosphate.

According to some embodiments, a curable paste that results from combining any of the mixtures disclosed herein with water comprises a density that is equal or substantially equal to the density of Portland cement pastes. In some embodiments, the density of the curable paste is 80% to 120% of the density of Portland cement pastes.

According to some embodiments, a curable paste that results from combining any of the mixtures disclosed herein with water comprises a rate of leaching that is equal to substantially equal to a rate of leaching of Portland cement pastes. In some embodiments, the rate of leaching of the curable paste is 80% to 120% of the rate of leaching of Portland cement pastes.

According to some embodiments, a curable paste that results from combining any of the mixtures disclosed herein with water comprises a Poisson's Ratio that is equal to substantially equal to Poisson's Ratio of Portland cement pastes. In some embodiments, the Poisson's Ratio of the curable paste is 70% to 150% (e.g., 70%-150%, 70%-140%, 70%-130%, 70%-120%, 70%-110%, 70%-100%, 70%-90%, 70%-80%, 80%-150%, 80%-140%, 80%-130%, 80%-120%, 80%-110%, 80%-100%, 80%-90%, 90%-150%, 90%-140%, 90%-130%, 90%-120%, 90%-110%, 90%-100%, 100%-150%, 100%-140%, 100%-130%, 100%-120%, 100%-110%, 110%-150%, 110%-140%, 110%-130%, 110%-120%, 120%-150%, 120%-140%, 120%-130%, 130%-150%, 130%-140%, 140%-150%, 95%-105%, 85%-115%, 75%-125%, percentages between the foregoing ranges, etc.) of the Poisson's ratio of Portland cement pastes. In some embodiments, the Poission's Ratio of a curable paste that results from combining any of the mixtures disclosed herein with water is 0.15 to 0.30 (e.g., 0.15, 0.16, 0.17, 0.18, 0.19, 0.20, 0.21, 0.22, 0.23, 0.24, 0.25, 0.15-0.25, 0.15-0.20, 0.25-0.30, 0.20-0.25, 0.20-0.27, 0.20-0.30, values between the foregoing values and ranges, etc.).

According to some embodiments, a curable paste that results from combining any of the mixtures disclosed herein with water comprises a modulus of elasticity that is equal to substantially equal to the modulus of elasticity of Portland cement pastes. In some embodiments, the modulus of elasticity of the curable paste is 50% to 200% (e.g., 50-200, 50-190, 50-180, 50-170, 50-160, 50-150, 50-140, 50-130, 50-120, 50-110, 50-100, 50-90, 50-80, 50-70, 50-60, 60-200, 60-190, 60-180, 60-170, 60-160, 60-150, 60-140, 60-130, 60-120, 60-110, 60-100, 60-90, 60-80, 60-70, 70-200, 70-190, 70-180, 70-170, 70-160, 70-150, 70-140, 70-130, 70-120, 70-110, 70-100, 70-90, 70-80, 80-200, 80-190, 80-180, 80-170, 80-160, 80-150, 80-140, 80-130, 80-120, 80-110, 80-100, 80-90, 90-200, 90-190, 90-180, 90-170, 90-160, 90-150, 90-140, 90-130, 90-120, 90-110, 90-100, 100-200, 100-190, 100-180, 100-170, 100-160, 100-150, 100-140, 100-130, 100-120, 100-110, 110-200, 110-190, 110-180, 110-170, 110-160, 110-150, 110-140, 110-130, 110-120, 120-200, 120-190, 120-180, 120-170, 120-160, 120-150, 120-140, 120-130, 130-200, 130-190, 130-180, 130-170, 130-160, 130-150, 130-140, 140-200, 140-190, 140-180, 140-170, 140-160, 140-150, 150-200, 150-190, 150-180, 150-170, 150-160, 160-200, 160-190, 160-180, 160-170, 170-200, 170-190, 170-180, 180-200, 180-190, 190-200, 95-105, 85-115, 75-125, 65-135, 55-145, values between the foregoing values and ranges, etc.) of the modulus of elasticity of Portland cement pastes. In some embodiments, the modulus of elasticity of a curable paste that results from combining any of the mixtures disclosed herein with water is $3(10^6)$ to $5(10^6)$ (e.g., $3(10^6)$ to $5(10^6)$, $3.0(10^6)$ to $3.5(10^6)$, $3.5(10^6)$ to $4.0(10^6)$, $4.0(10^6)$ to $4.5(10^6)$, $4.5(10^6)$ to $5.0(10^6)$, $3(10^6)$ to $4(10^6)$, $3.0(10^6)$ to $4.5(10^6)$, $3.5(10^6)$ to $5.0(10^6)$, $3.5(10^6)$ to $4.5(10^6)$, $3.0(10^6)$, $3.1(10^6)$, $3.2(10^6)$, $3.3(10^6)$, $3.4(10^6)$, $3.5(10^6)$, $3.6(10^6)$, $3.7(10^6)$, $3.8(10^6)$, $3.9(10^6)$, $4.0(10^6)$, $4.1(10^6)$, $4.2(10^6)$, $4.3(10^6)$, $4.4(10^6)$, $4.5(10^6)$, $4.6(10^6)$, $4.7(10^6)$, $4.8(10^6)$, $4.9(10^6)$, $5.0(10^6)$ psi, values between the foregoing values and ranges, etc.) psi.

According to some embodiments, the curable mix or formulation comprises two or more materials, wherein the two or more materials comprise at least one waste glass component and at least one post-consumer material.

According to some embodiments, the mixture does not create gypsum as an initial component; however, the mixture once combined with water creates at least a measurable amount of gypsum.

According to some embodiments, the mixture is configured to be combined with water to create a curable paste, wherein the amount of water used to create the curable paste is 75% to 125% by mass of the amount of MgO in the mixture.

According to some embodiments, a curable mixture configured to set in the presence of water comprises magnesium oxide and at least one accelerant, wherein the at least one accelerant comprises magnesium chloride or magnesium nitrate. In some embodiments, the magnesium chloride is in the form of $MgCl_2.6H_2O$. In some embodiments, the magnesium nitrate in the form of $Mg(NO_3)_2.6H_2O$. In some embodiments, a proportion by weight of $MgCl_2.6H_2O$ or $Mg(NO_3)_2.6H_2O$ is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of magnesium oxide by weight of the mixture. In some embodiments, the mixture does not comprise Portland cement. In some embodiments, the mixture does not comprise Portland cement or gypsum. In some embodiments, 7-day strength of the mixture once combined with water and permitted to cure is at least 6000, 6500, 7000, 7500, 8000, 8500, 9000 psi, values between the foregoing, greater than 9000 psi, etc.). In some embodiments, 1-day strength of the mixture once combined with water and permitted to cure is at least 4000, 4500, 5000, 5500, 6000, 6500, 7000 psi, values between the foregoing, greater than 7000 psi, etc.).

According to some embodiments, the mixture further comprises at least one filler material or other additive, wherein a proportion of the at least one filler material or other additive is 400% to 550% (e.g., 400%-550%, 400%-450%, 400%-500%, 450%-550%, 450%-550%, 500%-550%, 400%-550%, values between the foregoing ranges, etc.) of the proportion of magnesium oxide by weight of the mixture. In some embodiments, the mixture additionally includes at least one additional accelerant.

BRIEF DESCRIPTION OF THE DRAWINGS

These and other features, aspects and advantages of the present application are described with reference to drawings of certain embodiments, which are intended to illustrate, but not to limit, the present disclosure. It is to be understood that the attached drawings are for the purpose of illustrating concepts disclosed in the present application and may not be to scale.

The FIGURE schematically illustrates various components of a curable mix or formulation according to one embodiment.

DETAILED DESCRIPTION

According to some embodiments, certain formulations or mixes that are configured to be combined with water (and/or other liquids) to cure and set in order to form materials suitable for construction are disclosed herein. Such mixes comprise MgO and are alternatives to Portland cement, other calcium-containing binder materials and other traditional binder formulations.

In some embodiments, such mixes, before being combined with water and/or another liquid (herein referred to as "dry" mixes), do not contain Portland cement. As noted herein, under certain circumstances, mixtures that do not comprise Portland cement can provide an environmental benefit (e.g., by reducing greenhouse gas emissions).

In some embodiments, the mixture does not comprise Portland cement. In some embodiments, the mixture does not comprise Portland cement or gypsum. In some embodiments, the mixture does not comprise gypsum as an initial mixture ingredient. For example, in some embodiments, although the dry mixture does not include gypsum, gypsum in some final or intermediate form may be created after the dry mixture is combined with water (e.g., during after curing).

In some embodiments, the creation of gypsum (and/or similar materials) during the curing of one or more of the mixes disclosed herein can provide additional benefits and advantages. For example, gypsum that is created during the curing process for one or more of the mixes disclosed herein can react with atmospheric carbon dioxide. This can result in advantageous absorption of atmospheric carbon dioxide into the curing mixture, and thus, out of the environment. Thus, not only does the use of the mixes disclosed herein benefit the environment by directly reducing the carbon footprint (e.g., avoiding the use of Portland cement and other carbon-rich materials), but the creation of gypsum and/or other materials as a result of the curing process can help further remove carbon dioxide from the environment.

In some arrangements, the mixes or formulations disclosed herein are configured to produce a final cured product that, once combined with water and/or one or more other liquids and provided with sufficient time to set, is suitable for long-term contact with reinforcing bar (rebar), mesh, other types of steel (beams, channels, rods, fasteners, etc.) and/or any other metal or material susceptible to corrosion. Accordingly, such formulations can be ubiquitously used in the construction industry where steel or other metallic reinforcement and/or contact is desired or required. However, in other embodiments, as discussed further herein, the formulations can be used in structural or non-structural applications irrespective of whether rebar or other metal contacts the final cured product resulting from such formulations.

According to some embodiments, the pH of the mix (e.g., dry mix) and/or the resulting paste and cured product (e.g., the dry mix combined with water or other fluid, the mix during setting or curing, the mix once set or cured, the final cured product, etc.) is basic. For example, in some arrangements, the pH of the mix (e.g., dry mix) and/or the resulting paste and cured product is 8 to 11 (e.g., 8-11, 8-10, 8-9, 9-11, 9-10, 8.5, 9.5, 8-9.5, 8.5-11. 8.5-10, ranges between the foregoing values, etc.). In some arrangements, the pH of the mix (e.g., dry mix) and/or the resulting paste and cured product is 10 or above (e.g., 10, 11, 12, 13, 10 to 11, 11 to 12, 12 to 13, above 13, 10 to 14, 10 to 13, 10 to 12, 11 to 14, 11 to 13, 12 to 14, pH values between the foregoing ranges or values, etc.). In other embodiments, the pH of the mix (e.g., dry mix) and/or the resulting paste and cured product is 7 or slightly above 7 (e.g., 7-8, 7-7.5, 7.5-8, values between the foregoing ranges, etc.). On the other hand, the pH of Portland cement mixes is usually far more alkaline. For example, the pH of Portland cement typically is over 13. As a result, there is substantial occupational, health and safety risk for workers and others who are exposed to such cement mixtures. When dealing such mixtures, individuals need to wear gloves and other protective gear when working with Portland cement mixtures. Accordingly, handling and/or otherwise working with the various curable mixtures disclosed herein is safer due to the much lower pH relative to traditional Portland cement formulations.

According to some embodiments, as disclosed in several example arrangements detailed herein, the accelerator comprises, at least in part, magnesium nitrate, $Mg(NO_3)_2$ (e.g., $Mg(NO_3)_2.6H_2O$). Magnesium nitrate is, at least in some forms, a corrosion inhibitor. Thus, the use of magnesium nitrate as an accelerator can help with the protection of rebar and/or any other steel or metal that is used in connection with the use of curable products.

For at least some of the formulations disclosed herein, the paste (or the product resulting from combining the corresponding dry mix with water and/or another liquid) comprises a density that is at least equal or greater than the density of known magnesium oxide and/or Portland cements formulations. In some embodiments, the density of the pastes using the formulations disclosed herein are 0-10% (e.g., 0-10, 0-5, 2-8, 2-10, 5-10, 2-5, 5-8, 1-9%, percentages between the foregoing ranges, etc.) more dense than pastes using known magnesium oxide or Portland cements formulations. Accordingly, in some arrangements, the density of the pastes using the formulations disclosed herein can be equal, substantially equal, less than or greater than the density of pastes using known magnesium oxide or Portland cements formulations.

According to some embodiments, the density of the pastes using the formulations disclosed herein is approximately the same as the density of pastes using known magnesium oxide or Portland cements formulations. For example, in some embodiments, the density of the pastes using the formulations disclosed herein is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the density of pastes using known magnesium oxide or Portland cements formulations.

The use of formulations that result in denser pastes can provide one or more advantages to the resulting curable product. For instance, in embodiments where the curable product is used with rebar, mesh and/or other steel components or members, the higher density can help protect against corrosion. In some configurations, for example, the denser paste can reduce the likelihood of water or other fluids coming in contact with rebar or other steel/metallic components or members used in connection with a curable product. In some embodiments, the denser pastes resulting from some of the mixtures disclosed herein can reduce penetration of water or other fluids originating from outside the cured product by 5% to 40% (e.g., 5-40, 10-40-15-40, 20-40, 25-40, 30-40, 35-40, 5-35, 10-35, 15-35, 20-35, 25-35, 30-35, 5-30, 10-30, 15-30, 20-30, 25-30, 5-25, 10-25, 15-25, 20-25, 5-20, 10-20, 15-20, 5-15, 10-15%, percentage values or ranges between the foregoing ranges, etc.).

For at least some of the embodiments disclosed herein, the MgO curable formulations are proportioned to increase in strength when exposed (e.g., intermittently, continuously, etc.) to water and/or other fluids or environments where water (e.g., in liquid, gas, solid form) is present. Multiple prior attempts involving the use of MgO cements in such water environments have failed or have otherwise been unsuccessful. For example, prior attempts have encountered problems associated with cracking and/or loss of structural strength or integrity. One reason for such structural undermining is attributable to the use (or an excessive amount) of magnesium chloride in such formulations.

Accordingly, in some formulations, the use of magnesium chloride is either eliminated or reduced. In some arrangements, the amount of magnesium chloride in the dry mix is maintained below a particular threshold. For example, the proportion of $MgCl_2$, specifically in the form of $MgCl_2.6H_2O$, by percentage of weight in the dry mix or formulation is less than 15% (e.g., less than 15%, less than 14%, less than 13%, less than 12%, less than 11%, less than 10%, less than 8%, less than 7%, less than 6%, less than 5%, less than 4%, less than 3%, less than 2%, less than 1%, 0%, 0-15%, 5-10%, values between the foregoing values or ranges, etc.) of the proportion of MgO by percentage of weight in the dry mix or formulation.

According to some embodiments, the proportion of $MgCl_2$, specifically in the form of $MgCl_2.6H_2O$, by percentage of weight in the dry mix or formulation is less than 5% (e.g., less than 5%, less than 4%, less than 3%, less than 2%, less than 1%, less than 0.5%, 0%, 0-5%, 1-5%, 2-5%, 3-5%, 4-5%, 0-4%, 1-3%, values between the foregoing values or ranges, etc.) of the proportion of the entire dry mix or formulation by percentage of weight.

However, in other formulations, as discussed in greater detail below, the proportion of $MgCl_2$, specifically in the form of $MgCl_2.6H_2O$, by percentage of weight in the dry mix or formulation is greater than 15% of the proportion of MgO by percentage of weight in the dry mix or formulation, as required or required for a particular application or use.

Accordingly, the formulations or mixes disclosed herein, or equivalents thereof, can be used in one or more of the following non-limiting applications, industries and/or contexts: building construction both residential and commercial (e.g., used in columns, beams and other load-bearing members), walls and other construction panels (e.g., including non-load bearing members), airports, dams, levees, bridges, tunnels, harbors, refineries and other industrial sites, parking structures, roadways, tile and other flooring, sidewalks, pipes, channels, countertops and/or the like. Depending on final cured product's ability to not damage steel or other metals, one or more of formulations or mixes are suitable for use in applications tensile reinforcement is desired or required (e.g., to prevent or reduce the likelihood of cracking, breaking and/or other compromising occurrence to the cured product).

According to some embodiments, one or more of the mixes disclosed herein can be combined with water (and/or any other suitable liquid) to form, with sufficient curing time, a hardened final product. In some arrangements, the final product that results from curing one or more of the various mixes disclosed herein, and equivalents thereof, can comprise a similar or greater structural strength than commercially available or other known cement mixes that include Portland cement, while at the same time, providing additional benefits and advantages as disclosed herein (e.g., reduction of carbon footprint, heat dispersion benefits, enablement of thicker pours, worker/user safety benefits, anti-leaching benefits, etc.).

By way of example, the strength of the cured product using various formulations or mixes disclosed herein can be 90% to 110% (e.g., 90-100%, 90-100%, 100%, 100-110%, values between the foregoing ranges, etc.) of the strength of commercially available and/or other known cement mixes that include Portland cement. In other embodiments, however, the strength of the cured product using various formulations or mixes disclosed herein can be greater than 110% (e.g., 110-120%, 120-130%, 130-140%, 140-150%, greater than 150%, values between the foregoing ranges, etc.) of the strength of commercially available and/or other known cement mixes that include Portland cement.

For any of the embodiments disclosed herein, the amount of water (and/or other liquid) added to the dry mix to form the curable product is equal or substantially equal to the amount of MgO (e.g., by mass). In some embodiments, the mass of water (and/or other liquid) added to the dry mix to form the curable product is 75% to 125% (e.g., 75-125, 80-120, 85-115, 90-110, 95-105, 75-100, 100-125%, percentages between the foregoing ranges, etc.) of the mass of MgO.

According to some embodiments, for one or more of the mix configurations disclosed herein, the rate of leaching of components ($MgCl_2$, $Mg(NO_3)_2$, $MgSO_4$, hydrous, anhydrous and/or other compounds having the same, etc.), during and/or following cure, is equal to or lower relative to the rate of leaching in known cements (e.g., Portland cements, MgO or other magnesia cements, etc.). In some embodiments, the rate of leaching by mass can be lower by 0%-10% (e.g., 0-10, 0-5, 2-8, 2-10, 5-10, 2-5, 5-8, 1-9%, percentages between the foregoing ranges, etc.) relative to known cements. In some embodiments, the rate of leaching for one or more of the mix configurations disclosed herein is equal or substantially equal of the rate of leaching of known cements (e.g., Portland cements, MgO or other magnesia cements, etc.). In other arrangements, however, the rate of leaching by mass can be lower by more than 10% (e.g., 10-15, 15-20, 20-30%, greater than 30%, etc.).

The term slag cement as used herein is a broad term and includes any by-product following the separation (e.g., via smelting) of a metal from its raw ore that has cementitious components and/or characteristics. Slag cement can include, without limitation, water-cooled slags, blast furnace slags and the like. As noted below, in some embodiments, the slag cement satisfies the ASTM requirements. In some embodiments, slag cement comprises granulated blast-furnace slag that has been ground to cement fineness with or without additions and that is a hydraulic cement. In some embodiments, slag cement is a hydraulic cement formed when granulated blast furnace slag (GGBFS) is ground to suitable fineness. In some embodiments, slag cement comprises a recovered industrial by-product of an iron blast furnace. In some embodiments, slag cement and/or another primary cementitious component comprises a hydraulic cement.

In addition, for any of the embodiments disclosed herein, the slag cement included in a mix may be replaced (or supplemented) by one or more other materials, such as, for example and without limitation, Class C fly ash and/or any other material that includes similar cementitious properties that is capable of being combined with magnesium oxide.

As noted above, according to some embodiments, one component of the dry mixes disclosed herein includes a primary cementitious component. In some configurations, the primary cementitious component comprises slag cement. In other embodiments, the primary cementitious component comprises slag cement, Class C fly ash and/or another cementitious component that is configured to be combined with the magnesium oxide of the mix such that the component forms binder on its own in the presence of water or another liquid. According to some embodiments, the Class C fly ash or any other primary cementitious component conforms to all or at least some of the requirements set forth in ASTM C618.

According to some embodiments, slag cement includes ground granulated blast-furnace slag, quenched slag or any other slag that is obtained by quenching molten iron slag from a blast furnace (e.g., in water, steam, etc.). In some embodiments, the slag is cooled rapidly to produce a glassy granular product. In some arrangements, the slag cement meets the requirements of ASTM C989.

In some embodiments, the proportions of MgO and primary cementitious component (e.g., slag cement, Class C fly ash, etc.) in the formulation (e.g., the dry formulation before any water and/or other liquid is added) are relatively equal to one another. For example, the proportion of the primary cementitious component by percentage of weight in the dry mix or formulation is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of MgO by percentage of weight in the dry mix or formulation. In other embodiments, the proportion of the primary cementitious component by percentage of weight in the dry mix or formulation is 70% to 130% (e.g., 70%-130%, 70%-120%, 80%-130%, 80%-120%, 90%-110%, 95%-105%, 98%-102%, 70%-100%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of MgO by percentage of weight in the dry mix or formulation.

According to some embodiments, a formulation or mix comprises a combined MgO and primary cementitious component content, as a percentage by weight of the dry formulation or mix, that is 40% to 70% (e.g., 40%-70%, 50%-60%, 40%-60%, 40%-50%, 40%-45%, 45%-50%, 45%-55%, 45%-60%, 45%-65%, 45%-70%, 50%-55%, 50%-65%, 50%-70%, 55%-60%, 55%-65%, 55%-70%, 60%-65%, 60%-70%, other percentages between the foregoing ranges, etc.). In certain configurations, the combined proportions of MgO and primary cementitious component in the dry mixture (e.g., before the mixture is combined with water and/or another liquid) is at least 40% (e.g., at least 40%, 45%, 50%, 55%, 60%, 65%, greater than 65%, etc.), as desired or required. In some embodiments, the combined proportions of MgO and primary cementitious component in the dry mixture (e.g., before the mixture is combined with water and/or another liquid) is at least 15% (e.g., at least 15%, 20%, 25%, 30%, 35%, 40%, 45%, 50%, 55%, 60%, 65%, greater than 65%, etc.), as desired or required.

According to some embodiments, a formulation or mix comprises a combined MgO and primary cementitious component content, as a percentage by weight of the dry formulation or mix, that is 15% to 50% (e.g., 15%-50%, 20%-40%, 25%-35%, 15%-20%, 15%-25%, 15%-30%, 15%-35%, 15%-40%, 15%-45%, 20%-25%, 20%-30%, 20%-35%, 20%-40%, 20%-45%, 20%-50%, 25%-30%, 25%-40%, 25%-50%, 30%-35%, 30%-40%, 30%-50%, other percentages between the foregoing ranges, etc.).

In some embodiments, a formulation or mix comprises a MgO content, as a percentage by weight of the dry formulation or mix, that is 20% to 50% (e.g., 20%-50%, 20%-45%, 20%-40%, 20%-25%, 20%-30%, 20%-35%, 25%-50%, 25%-45%, 25%-40%, 25%-30%, 25%-35%, 25%-40%, 30%-50%, 30%-45%, 30%-35%, 30%-40%, 22%-28%, 23%-27%, other percentages between the foregoing ranges, etc.). In certain configurations, the proportion of MgO in the dry mixture (e.g., before the mixture is combined with water and/or another liquid) is less than 40% (e.g., below 40%, 39%, 38%, 37%, 36%, 35%, 34%, 33%, 32%, 31%, 30%, 25% or below 20%, 25%-30%, 20%-25%, 10%-20%, 5%-10%, 5%-15%, specific percentages between the foregoing values, etc.). In some embodiments, the proportion of MgO in the dry mixture (e.g., before the mixture is combined with water and/or another liquid) is less than 10% (e.g., below 10%, 9%, 8%, 7%, 6%, 5%, 4%, 3%, 2%, 1%, specific percentages between the foregoing values, etc.).

According to some arrangements, the proportion of MgO in the dry mixture (e.g., before the mixture is combined with water and/or another liquid) is 20% to 35% (e.g., 20%-35%, 20%-30%, 20%-25%, 22%-28%, 25%-30%, 25%-35%, 30%-35%, values between the foregoing ranges, etc.) of the dry mixture by weight. Likewise, in some arrangements, the proportion of the primary cementitious component in the dry mixture (e.g., before the mixture is combined with water and/or another liquid) is 20% to 35% (e.g., 20%-35%, 20%-30%, 20%-25%, 22%-28%, 25%-30%, 25%-35%, 30%-35%, values between the foregoing ranges, etc.) of the dry mixture by weight.

According to some arrangements, the proportion of MgO in the dry mixture (e.g., before the mixture is combined with water and/or another liquid) is 5% to 20% (e.g., 5%-20%, 5%-15%, 5%-10%, 10%-20%, 10%-15%, values between the foregoing ranges, etc.) of the dry mixture by weight. Likewise, in some arrangements, the proportion of the primary cementitious component (e.g., slag cement, Class C fly ash, combinations of the foregoing, etc.) in the dry mixture (e.g., before the mixture is combined with water and/or another liquid) is 5% to 20% (e.g., 5%-20%, 5%-15%, 5%-10%, 10%-20%, 10%-15%, values between the foregoing ranges, etc.) of the dry mixture by weight.

The mixes include one or more accelerators or compounds that help decrease setting time and increase early-age strength gain once the mixes are combined with water and/or another liquid. In some embodiments, such accelerators include chloride ($Cl_2$), sulfate ($SO_4$) and/or nitrate ($NO_3$). In some embodiments, the accelerators are provided as part of a magnesium-based material, such as, for example, magnesium chloride ($MgCl_2$), magnesium sulfate ($MgSO_4$) or magnesium nitrate ($Mg(NO_3)_2$). These (and/or other) accelerators can be provided in a dry crystalline form, such as, for example, $MgCl_2.6H_2O$, $Mg(NO_3)_2.6H_2O$ and/or $MgSO_4.7H_2O$. In other arrangements, however, accelerators can be provided in the mixes as part of a solution (e.g., in liquid form), as desired or required.

In some arrangements, the mixtures comprise sodium hexametaphosphate ($(NaPO3)6$ or SHMP) or one or more other phosphate-based accelerators, either in addition to or lieu of accelerants that include chloride ($Cl_2$), sulfate ($SO_4$) and/or nitrate ($NO_3$).

For any of the embodiments disclosed herein, the mixture is designed to not include sodium hexametaphosphate. In some arrangements, the mixture does not include any sodium hexametaphosphate. In some embodiments, the mixture does not include phosphate or phosphorus-based material. However, in some arrangements, the mixture includes one or more phosphate materials, but not sodium hexametaphosphate, such as, for example, any other alkali metal phosphate or phosphoric acid.

According to some embodiments, one or more of the mixes disclosed herein do not include any accelerators that are phosphate or carbonate-based. For example, in some configurations, the mixes only include magnesium-containing accelerators (e.g., $MgCl_2$, $MgSO_4$, etc.). In some embodiments, when non-magnesium based accelerators (e.g., SHMP) are included in a mix, the content of such non-magnesium based accelerators is relatively small. For example, in some arrangements, the content of such non-magnesium based accelerators in the mix is less than 2% by weight of the entire dry mixture (e.g., 0%-2%, 0.1%-2%, 0%-1%, 0.1%-1%, 1%-2%, specific percentages between the foregoing ranges, etc.).

In some embodiments, the mixture comprises one or more additional components. Such fillers and other additives can be included as desired or required to provide certain properties and other characteristics to the mixture and/or the final cured product. Fillers and additives can comprise, without limitation, one or more of the following: pumice or other volcanic rock or material, sand, aggregate (e.g., fine aggregate, coarse aggregate, intermediate aggregate, other types of aggregate, etc.), talc, other clay material, fibers (e.g., steel and/or other metallic fibers, polypropylene and/or other polymeric fibers, glass fibers, asbestos fibers, carbon fibers, organic fibers, etc.), glass fiber reinforced plastic (GFRP), other reinforced polymers, admixtures or other additives that facilitate with fire protection, water protection, corrosion resistance/inhibition, workability, and/or one more other properties of the final cured product (e.g., MasterPel, Rheo-Cell, MasterCell, etc.), sodium naphthalene sulfonate formaldehyde (SNF) and/or other surfactants, plasticizers, pigments, dyes and other color additives, titanium dioxide, other minerals, other natural or synthetic materials, other filler materials and/or the like.

According to some embodiments, a pH of any of the mixtures disclosed herein, after being combined with water, is 8 to 11 (e.g., 8-11, 8-10, 8-9, 9-11, 9-10, 8.5, 9.5, 8-9.5, 8.5-11. 8.5-10, ranges between the foregoing values, etc.). According to some embodiments, a pH of any of the mixtures disclosed herein, after being combined with water, is 10 or greater (e.g., 10, 11, 12, 13, 10-11, 11-12, 12-13, greater than 13, values between the foregoing values and ranges, etc.).

According to some embodiments, any of the mixtures disclosed herein do not contain SHMP or any other phosphate.

According to some embodiments, a curable paste that results from combining any of the mixtures disclosed herein with water comprises a density that is equal or substantially equal to the density of Portland cement pastes. In some embodiments, the density of the curable paste is 90% to 110% of the density of Portland cement pastes.

According to some embodiments, a curable paste that results from combining any of the mixtures disclosed herein with water comprises a rate of leaching that is equal or substantially equal to the rate of leaching of Portland cement pastes. In some embodiments, the rate of leaching of the curable paste is 90% to 110% of the rate of leaching of Portland cement pastes.

According to some embodiments, the slag cement comprises one or more of the following: water-cooled slags, blast furnace slags, other slags that have cementitious qualities and the like. As discussed in greater detail herein, one or more other types of slags and/or other non-cementitious components can be included in a particular mix that will not be a primary cementitious component. These materials include, without limitation, air-cooled slags, other non-cementitious slags, non-Class C fly ash, silica fume, nano-silica, fine silica glass, other silica-based materials, waste glass, ground glass, other glass-containing materials, post-consumer materials, and other waste materials.

According to some embodiments, the mixture does not create gypsum as an initial component; however, the mixture once combined with water creates at least a measurable amount of gypsum.

According to some embodiments, the mixture is configured to be combined with water to create a curable paste, wherein the amount of water used to create the curable paste is 75% to 125% (e.g., 75%-125%, 75%-120%, 75%-115%, 75%-110%, 75%-105%, 75%-100%, 75%-95%, 75%-90%, 75%-85%, 75%-80%, 80%-125%, 80%-120%, 80%-115%, 80%-110%, 80%-105%, 80%-100%, 80%-95%, 80%-90%, 80%-85%, 85%-125%, 85%-120%, 85%-115%, 85%-110%, 85%-105%, 85%-100%, 85%-95%, 85%-90%, 90%-125%, 90%-120%, 90%-115%, 90%-110%, 90%-105%, 90%-100%, 90%-95%, 95%-125%, 95%-120%, 95%-115%, 95%-110%, 95%-105%, 95%-100%, 100%-125%, 100%-120%, 100%-115%, 100%-110%, 100%-105%, 105%-125%, 105%-120%, 105%-115%, 105%-110%, 110%-125%, 110%-120%, 110%-115%, 115%-125%, 115%-120%, 120%-125%, values between the foregoing ranges, etc.) by mass of the amount of MgO in the mixture.

General Mix Summary

According to some embodiments, any of the curable mixes and formulations disclosed herein can include four different components. As shown schematically in the FIGURE, a curable mix or formulation 10 can comprise (i) magnesium oxide (MgO), (ii) a primary cementitious component, (iii) an accelerant, and (iv) fillers and/or other additives. Such mixes and formulations can be combined with water and/or other liquids and allowed to cure, thereby creating a cured final product (e.g., structure, slab, etc.).

With continued reference to the FIGURE, the curable mix or formulation can include equal or substantially equal portions (by weight of the dry mix) of MgO and the primary cementitious component. As noted above, the primary cementitious component can comprise slag cement, Class C fly ash and/or any other material that has cementitious qualities (e.g., is configured to react with MgO and/or other components of the mix to form binder).

For any of the mix or formulation embodiments disclosed herein, the proportions of MgO and primary cementitious component (e.g., slag cement, Class C fly ash, etc.) in the formulation (e.g., the dry formulation before any water and/or other liquid is added) can be relatively equal to one another. For example, the proportion of the primary cementitious component by percentage of weight in the dry mix or formulation is 70% to 130% (e.g., 70%-130%, 80%-120%, 90%-110%, 95%-105%, 98%-102%, 99%-101%, values between the foregoing ranges, etc.) of the proportion of MgO by percentage of weight in the dry mix or formulation.

In some embodiments, the formulation or mix can comprise a combined MgO and primary cementitious component content, as a percentage by weight of the dry formulation or mix, that is 40% to 80% (e.g., 40%-80%, 40%-75%, 40%-70%, 40%-65%, 40%-60%, 40%-55%, 40%-50%, 40%-45%, 45%-80%, 45%-75%, 45%-70%, 45%-65%, 45%-60%, 45%-55%, 45%-50%, 50%-80%, 50%-75%, 50%-70%, 50%-65%, 50%-60%, 50%-55%, 55%-80%, 55%-75%, 55%-70%, 55%-65%, 55%-60%, 60%-80%, 60%-75%, 60%-70%, 60%-65%, 65%-80%, 65%-75%, 65%-70%, 70%-80%, 70%-75%, 75-80%, percentages between the foregoing ranges, etc.).

In other arrangements, the formulation or mix can comprise a combined MgO and primary cementitious component content, as a percentage by weight of the dry formulation or mix, that is 10% to 50% (e.g., 10%-50%, 10%-45%, 10%-40%, 10%-35%, 10%-30%, 10%-25%, 10%-20%, 10%-

15%, 15%-50%, 15%-45%, 15%-40%, 15%-35%, 15%-30%, 15%-25%, 15%-20%, 20%-50%, 20%-45%, 20%-40%, 20%-35%, 20%-30%, 20%-25%, 25%-50%, 25%-45%, 25%-40%, 25%-35%, 25%-30%, 30%-50%, 30%-45%, 30%-40%, 30%-35%, 35%-50%, 35%-45%, 35%-40%, 40%-50%, 40%-45%, 45-50%, percentages between the foregoing ranges, etc.).

According to some embodiments, the sum of the proportions of magnesium oxide and primary cementitious component (e.g., slag cement, Class C fly ash) is 40% to 70% (e.g., 40%-70%, 50%-60%, 40%-60%, 40%-50%, 40%-45%, 45%-50%, 45%-55%, 45%-60%, 45%-65%, 45%-70%, 50%-55%, 50%-65%, 50%-70%, 55%-60%, 55%-65%, 55%-70%, 60%-65%, 60%-70%, other percentages between the foregoing ranges, etc.) by weight of the mixture.

According to some embodiments, as illustrated in the FIGURE, the curable mix or formulation 10 additionally comprises at least one accelerant. In some embodiments, the accelerant comprises at least one of the following: magnesium chloride, magnesium nitrate and magnesium sulfate. In some embodiments, a proportion by weight of the at least one accelerant is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture. In some embodiments, a final cured product resulting from combining the mixture with water is suitable for long-term contact with reinforcing bar, mesh, steel and other materials susceptible to corrosion.

For any of the embodiments disclosed herein, the mixture is designed to not include sodium hexametaphosphate. In some arrangements, the mixture does not include any sodium hexametaphosphate. In some embodiments, the mixture does not include any phosphate or other phosphorus-based material According to some embodiments, the at least one accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 2% to 30% (e.g., 2%-12%, 2%-10%, 2%-8%, 2%-6%, 2%-5%, 2%-4%, 2%-3%, 3%-12%, 3%-10%, 3%-8%, 3%-6%, 3%-5%, 3%-4%, 5%-12%, 5%-10%, 6%-10%, 6%-8%, values between the foregoing ranges, etc.) of the proportion of magnesium oxide by weight of the mixture, and the at least one accelerant further comprises magnesium sulfate in the form of $MgSO_4.7H_2O$, wherein a proportion by weight of $MgSO_4.7H_2O$ is 15% to 50% (e.g., 15%-50%, 15%-45%, 15-40%, 15%-35%, 20%-50%, 20%-45%, 20%-40%, 20%-35%, 25%-50%, 25%-45%, 25%-40%, 25%-35%, 25%-30%, 30%-35%, values between the foregoing ranges, etc.) of the proportion of magnesium oxide by weight of the mixture.

According to some embodiments, the accelerant does not comprise a phosphate-based material. In some embodiments, the accelerant comprises a phosphate-based accelerant, wherein a proportion by weight of the phosphate-based accelerant is 0.1% to 5% (e.g., 0.1%-5%, 0.5%-5%, 1-5%, 1.5%-5%, 2%-5%, 2%-4.5%, 2%-4%, 2%-3.5%, 2.5%-5%, 2.5-4.5%, 2.5%-4%, 2.5%-3.5%, 2.5%-3%, 3%-3.5%, 3%-5%, 4%-5%, values between the foregoing ranges, etc.) of the proportion of magnesium oxide by weight of the mixture.

According to some embodiments, the accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 80% to 120% (e.g., 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of magnesium oxide by weight of the mixture.

According to some embodiments, the accelerant comprises magnesium sulfate in the form of $MgSO_4.7H_2O$, wherein a proportion by weight of $MgSO_4.7H_2O$ is 90% to 140% (e.g., 90%-140%, 90%-130%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, 105-130%, 105-140%, values between the foregoing ranges, etc.) of the proportion of magnesium oxide by weight of the mixture.

With further reference to the schematic representation illustrated in the FIGURE, the curable mix or formulation 10 can additionally include one or more fillers and/or other additives. Possible fillers and/or other additives include, but are not limited to, non-cementitious slags (e.g., air-cooled slags), non-Class C fly ash (e.g., Class F fly ash), silica fume, nanosilica, fine silica glass, other silica-based materials, waste glass, ground glass, other glass-containing materials, post-consumer materials, other waste materials, fine aggregate, intermediate aggregate, coarse aggregate, other types of aggregate, pumice or other volcanic rock or material, sand, talc, other clay material, fibers (e.g., steel and/or other metallic fibers, polypropylene and/or other polymeric fibers, glass fibers, asbestos fibers, carbon fibers, organic fibers, etc.), glass fiber reinforced plastic (GFRP), other reinforced polymers, admixtures or other additives that facilitate with fire protection, water protection, corrosion resistance/inhibition, workability, and/or one more other properties of the final cured product (e.g., MasterPel, RheoCell, MasterCell, etc.), sodium naphthalene sulfonate formaldehyde (SNF) and/or other surfactants, plasticizers, pigments, dyes and other color additives, titanium dioxide, other minerals, other natural or synthetic materials, other filler materials and/or the like.

In some embodiments, the fillers and/or other additives are included to react with the other components of the mix and/or to provide some beneficial characteristic or property to the resulting paste (e.g., once the mix is combined with water) and/or the final cured product. For example, in some embodiments, such materials (e.g., air-cooled slags, other non-cementitious slags, Class F fly ash, other non-cementitious fly ash, pozzolan, silica fume, etc.) can act to reduce the permeability of the resulting paste or cured product. In some embodiments, such materials help plug or otherwise fill holes or other cavities in the resulting paste and cured product. According to some arrangements, mixes or formulations that include materials that provide one or more benefits or other advantages to the resulting paste or cured product can be referred to as ternary mixes. In some embodiments, the non-cementitious components included in a ternary mix satisfy the requirements of ASTM C595.

In some embodiments, fillers and/or other additives are included to provide one or more other benefits and advantages, either in addition to or in lieu of reducing permeability. For instance, one or more additives listed above can facilitate with fire protection, water protection, corrosion resistance/inhibition, workability, and/or one more other properties of the final cured product.

In some embodiments, fillers such as aggregate (e.g., coarse aggregate, intermediate aggregate, fine aggregate, etc.), clay, pumice or other volcanic rock or material, sand, talc, other clay material, etc. are there merely as fillers. Such materials can provide the mix and the resulting paste and cured product with the desired or required density and structural properties.

According to some embodiments, the dry mixes or formulations disclosed herein do not contain Portland Cement and/or gypsum. In some embodiments, the pH of the mix (e.g., dry mix) and/or the resulting paste and cured product is 8 to 11 (e.g., 8-11, 8-10, 8-9, 9-11, 9-10, 8.5, 9.5, 8-9.5, 8.5-11. 8.5-10, ranges between the foregoing values, etc.). In some arrangements, the pH of the mix (e.g., dry mix) and/or the resulting paste and cured product is 10 or above (e.g., 10, 11, 12, 13, 10 to 11, 11 to 12, 12 to 13, above 13, 10 to 14, 10 to 13, 10 to 12, 11 to 14, 11 to 13, 12 to 14, pH values between the foregoing ranges or values, etc.). Thus, in some embodiments, the mixes are suitable to be used for applications that include rebar or other types of reinforcing metals.

According to some embodiments, one or more characteristics or properties (e.g., structural, physical, etc.) of the paste or cured product resulting from using the various mixes and formulations disclosed herein are similar (and/or even better or more preferred) than corresponding characteristics or properties of cured Portland cement mixes and formulations. For example, a curable paste that results from combining any of the mixtures disclosed herein with water comprises a density that is equal or substantially equal to the density of Portland cement pastes. In some embodiments, the density of the curable paste is 80% to 120% of the density of Portland cement pastes.

Further, according to some embodiments, a curable paste that results from combining any of the mixtures disclosed herein with water comprises a rate of leaching that is equal to substantially equal to a rate of leaching of Portland cement pastes. In some embodiments, the rate of leaching of the curable paste is 80% to 120% of the rate of leaching of Portland cement pastes.

In addition, according to some embodiments, a curable paste that results from combining any of the mixtures disclosed herein with water comprises a Poisson's Ratio that is equal to substantially equal to Poisson's Ratio of Portland cement pastes. In some embodiments, the Poisson's Ratio of the curable paste is 70% to 150% (e.g., 70%-150%, 70%-140%, 70%-130%, 70%-120%, 70%-110%, 70%-100%, 70%-90%, 70%-80%, 80%-150%, 80%-140%, 80%-130%, 80%-120%, 80%-110%, 80%-100%, 80%-90%, 90%-150%, 90%-140%, 90%-130%, 90%-120%, 90%-110%, 90%-100%, 100%-150%, 100%-140%, 100%-130%, 100%-120%, 100%-110%, 110%-150%, 110%-140%, 110%-130%, 110%-120%, 120%-150%, 120%-140%, 120%-130%, 130%-150%, 130%-140%, 140%-150%, 95%-105%, 85%-115%, 75%-125%, percentages between the foregoing ranges, etc.) of the Poisson's ratio of Portland cement pastes. In some embodiments, the Poission's Ratio of a curable paste that results from combining any of the mixtures disclosed herein with water is 0.15 to 0.30 (e.g., 0.15, 0.16, 0.17, 0.18, 0.19, 0.20, 0.21, 0.22, 0.23, 0.24, 0.25, 0.15-0.25, 0.15-0.20, 0.25-0.30, 0.20-0.25, 0.20-0.27, 0.20-0.30, values between the foregoing values and ranges, etc.).

Also, according to some embodiments, a curable paste that results from combining any of the mixtures disclosed herein with water comprises a modulus of elasticity that is equal to substantially equal to the modulus of elasticity of Portland cement pastes. According to some embodiments, a curable paste that results from combining any of the mixtures disclosed herein with water comprises a modulus of elasticity that is equal to substantially equal to the modulus of elasticity of Portland cement pastes. In some embodiments, the modulus of elasticity of the curable paste is 50% to 200% (e.g., 50-200, 50-190, 50-180, 50-170, 50-160, 50-150, 50-140, 50-130, 50-120, 50-110, 50-100, 50-90, 50-80, 50-70, 50-60, 60-200, 60-190, 60-180, 60-170, 60-160, 60-150, 60-140, 60-130, 60-120, 60-110, 60-100, 60-90, 60-80, 60-70, 70-200, 70-190, 70-180, 70-170, 70-160, 70-150, 70-140, 70-130, 70-120, 70-110, 70-100, 70-90, 70-80, 80-200, 80-190, 80-180, 80-170, 80-160, 80-150, 80-140, 80-130, 80-120, 80-110, 80-100, 80-90, 90-200, 90-190, 90-180, 90-170, 90-160, 90-150, 90-140, 90-130, 90-120, 90-110, 90-100, 100-200, 100-190, 100-180, 100-170, 100-160, 100-150, 100-140, 100-130, 100-120, 100-110, 110-200, 110-190, 110-180, 110-170, 110-160, 110-150, 110-140, 110-130, 110-120, 120-200, 120-190, 120-180, 120-170, 120-160, 120-150, 120-140, 120-130, 130-200, 130-190, 130-180, 130-170, 130-160, 130-150, 130-140, 140-200, 140-190, 140-180, 140-170, 140-160, 140-150, 150-200, 150-190, 150-180, 150-170, 150-160, 160-200, 160-190, 160-180, 160-170, 170-200, 170-190, 170-180, 180-200, 180-190, 190-200, 95-105, 85-115, 75-125, 65-135, 55-145, values between the foregoing values and ranges, etc.) of the modulus of elasticity of Portland cement pastes. In some embodiments, the modulus of elasticity of a curable paste that results from combining any of the mixtures disclosed herein with water is $3(10^6)$ to $5(10^6)$ (e.g., $3(10^6)$ to $5(10^6)$, $3.0(10^6)$ to $3.5(10^6)$, $3.5(10^6)$ to $4.0(10^6)$, $4.0(10^6)$ to $4.5(10^6)$, $4.5(10^6)$ to $5.0(10^6)$, $3(10^6)$ to $4(10^6)$, $3.0(10^6)$ to $4.5(10^6)$, $3.5(10^6)$ to $5.0(10^6)$, $3.5(10^6)$ to $4.5(10^6)$, $3.0(10^6)$, $3.1(10^6)$, $3.2(10^6)$, $3.3(10^6)$, $3.4(10^6)$, $3.5(10^6)$, $3.6(10^6)$, $3.7(10^6)$, $3.8(10^6)$, $3.9(10^6)$, $4.0(10^6)$, $4.1(10^6)$, $4.2(10^6)$, $4.3(10^6)$, $4.4(10^6)$, $4.5(10^6)$, $4.6(10^6)$, $4.7(10^6)$, $4.8(10^6)$, $4.9(10^6)$, $5.0(10^6)$ psi, values between the foregoing values and ranges, etc.) psi.

As noted herein, the formulations or mixes disclosed herein, or equivalents thereof, can be used in one or more of the following non-limiting applications, industries and/or contexts: building construction both residential and commercial (e.g., used in columns, beams and other load-bearing members), walls and other construction panels (e.g., including non-load bearing members), airports, dams, levees, bridges, tunnels, harbors, refineries and other industrial sites, parking structures, roadways, tile and other flooring, sidewalks, pipes, channels, countertops and/or the like. Depending on final cured product's ability to not damage steel or other metals, one or more of formulations or mixes are suitable for use in applications tensile reinforcement is desired or required (e.g., to prevent or reduce the likelihood of cracking, breaking and/or other compromising occurrence to the cured product).

According to some embodiments, the 7-day strength of the mixture once combined with water and permitted to cure is at least 2000 psi (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4500, 5000, 5500 psi, greater than 5500 psi, etc.). In some arrangements, the 1-day strength of the mixture once combined with water and permitted to cure is at least 1000 psi (e.g., 1000, 1100, 1200, 1300, 1400, 1500, 1600, 1700, 1800, 1900, 2000, 2500, 3000, 3500, 4000, 4500, psi, greater than 4500 psi, etc.).

Non-limiting embodiments of certain curable mixes are provided and discussed in greater detail below.

Mix A

According to some embodiments, a curable mix can comprise MgO, a primary cementitious component (e.g., slag cement, Class C fly ash) and $MgCl_2$ and/or $Mg(NO_3)_2$ as the primary accelerator. One example of such a mix is detailed in Tables A1 and A2 below. As can be seen from Table A1, such mixes can also include other types of accelerators and certain fillers and other additives.

As discussed above and illustrated in Table A1, the proportions of MgO and primary cementitious component (e.g., slag cement, Class C fly ash, etc.) in the formulation (e.g., the dry formulation before any water and/or other liquid is added) can be relatively equal to one another. For example, the proportion of the primary cementitious component by percentage of weight in the dry mix or formulation is 70% to 130% (e.g., 70%-130%, 80%-120%, 90%-110%, 95%-105%, values between the foregoing ranges, etc.) of the proportion of MgO by percentage of weight in the dry mix or formulation.

As also noted above and indicated in Table A1, the formulation or mix can comprise a combined MgO and primary cementitious component content, as a percentage by weight of the dry formulation or mix, that is 15% to 50% (e.g., 15%-50%, 20%-40%, 25%-35%, 15%-20%, 15%-25%, 15%-30%, 15%-35%, 15%-40%, 15%-45%, 20%-25%, 20%-30%, 20%-35%, 20%-40%, 20%-45%, 20%-50%, 25%-30%, 25%-40%, 25%-50%, 30%-35%, 30%-40%, 30%-50%, other percentages between the foregoing ranges, etc.).

In some arrangements, as noted in Table A1, the proportion of $MgCl_2$ and/or $Mg(NO_3)_2$, specifically in the form of $MgCl_2.6H_2O$ and/or $Mg(NO_3)_2.6H_2O$, respectively, by percentage of weight in the dry mix or formulation is 80% to 120% (e.g., 80%-120%, 85%-120%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of MgO by percentage of weight in the dry mix or formulation.

According to some embodiments, when the dry mix is combined with water or another liquid, the resulting cured product comprises a 1-day strength of at least 1000 psi (e.g., at least 1000 psi, at least 1500 psi, at least 2000 psi, at least 2500 psi, at least 3000 psi, values greater than 3000 psi, etc.).

According to some embodiments, when the dry mix is combined with water or another liquid, the resulting cured product comprises a 7-day strength of at least 3000 psi (e.g., at least 3000 psi, at least 3500 psi, at least 4000 psi, at least 4500 psi, at least 5000 psi, values greater than 5000 psi, etc.).

TABLE A1

Mix A - Composition

| Component | Proportion (by weight) of dry mix | Proportion (by weight of dry mix) relative to MgO |
|---|---|---|
| MgO | 20%-25% | |
| Primary cementitious component (e.g., slag cement, Class C fly ash) | 20%-25% | 90%-110% |
| $MgCl_2 \cdot 6H_2O$ or $Mg(NO_3)_2 \cdot 6H_2O$ | 20%-30% | 80%-120% |
| Other accelerators | 0%-2% | 0%-10% |
| Fillers/Other additives | 15%-35% | |

TABLE A2

Mix A - Properties of Cured Mix

| Property | Value |
|---|---|
| 1-day Strength (per ASTM C39 & ASTM C109) | >1000 psi |
| 7-day Strength (per ASTM C39 & ASTM C109) | >3000 psi |
| 28-day Strength (per ASTM C39 & ASTM C109) | >4000 psi |

Mix B

According to some embodiments, a curable mix can comprise MgO, a primary cementitious component (e.g., slag cement, Class C fly ash) and $MgCl_2$ (and/or $Mg(NO_3)_2$) and $MgSO_4$ as the primary accelerators. One example of such a mix is detailed in Tables B1 and B2 below. As can be seen from Table B1, such mixes can also include other types of accelerators and certain fillers and other additives. As can be seen from the table, in some embodiments, $MgCl_2$ (and/or $Mg(NO_3)_2$ can be completely eliminated from such mixes.

In some arrangements, as noted in Table B1, the proportion of $MgCl_2$ and/or $Mg(NO_3)_2$, specifically in the form of $MgCl_2.6H_2O$ and/or $Mg(NO_3)_2.6H_2O$, respectively, by percentage of weight in the dry mix or formulation is 0% to 12% (e.g., 0%, 0%-12%, 1%-12%, 2%-12%, 2%-10%, 2%-8%, 2%-6%, 2%-5%, 2%-4%, 2%-3%, 3%-12%, 3%-10%, 3%-8%, 3%-6%, 3%-5%, 3%-4%, 5%-12%, 5%-10%, 6%-10%, 6%-8%, values between the foregoing ranges, etc.) of the proportion of MgO by percentage of weight in the dry mix or formulation.

In addition, in some configurations, when the mix includes $MgCl_2$ and/or $Mg(NO_3)_2$, as also noted in Table B1, the proportion of $MgSO_4$, specifically in the form of $MgSO_4.7H_2O$, by percentage of weight in the dry mix or formulation is 12% to 45% (e.g., 12%-45%, 12%-40%, 15%-45%, 15%-40%, 15%-35%, 20%-45%, 20%-40%, 20%-35%, 25%-45%, 25%-40%, 25%-35%, 25%-30%, 30%-45%, 30%-40%, 30%-35%, values between the foregoing ranges, etc.) of the proportion of MgO by percentage of weight in the dry mix or formulation.

As discussed above and illustrated in Table B1, the proportions of MgO and primary cementitious component (e.g., slag cement, Class C fly ash, etc.) in the formulation (e.g., the dry formulation before any water and/or other liquid is added) can be relatively equal to one another. For example, the proportion of the primary cementitious component by percentage of weight in the dry mix or formulation is 70% to 130% (e.g., 70%-130%, 80%-120%, 90%-110%, 95%-105%, values between the foregoing ranges, etc.) of the proportion of MgO by percentage of weight in the dry mix or formulation.

As also noted above and indicated in Table B1, the formulation or mix can comprise a combined MgO and primary cementitious component content, as a percentage by weight of the dry formulation or mix, that is 40% to 80% (e.g., 40%-80%, 40%-75%, 40%-70%, 40%-65%, 40%-60%, 40%-55%, 40%-50%, 40%-45%, 45%-80%, 45%-75%, 45%-70%, 45%-65%, 45%-60%, 45%-55%, 45%-50%, 50%-80%, 50%-75%, 50%-70%, 50%-65%, 50%-60%, 50%-55%, 55%-80%, 55%-75%, 55%-70%, 55%-65%, 55%-60%, 60%-80%, 60%-75%, 60%-70%, 60%-65%, 65%-80%, 65%-75%, 65%-70%, 70%-80%, 70%-75%, 75-80%, percentages between the foregoing ranges, etc.).

According to some embodiments, such mixes can be suitable for long-term contact with reinforcing bar (rebar), mesh, other types of steel (beams, channels, rods, fasteners, etc.) and/or any other metal or material susceptible to corrosion.

For example, in some arrangements, the pH of the mix (e.g., dry mix) and/or the resulting paste and cured product is 8 to 11 (e.g., 8-11, 8-10, 8-9, 9-11, 9-10, 8.5, 9.5, 8-9.5, 8.5-11. 8.5-10, ranges between the foregoing values, etc.). In some arrangements, the pH of the mix (e.g., dry mix) and/or the resulting paste and cured product is 10 or above (e.g., 10, 11, 12, 13, 10 to 11, 11 to 12, 12 to 13, above 13, 10 to 14, 10 to 13, 10 to 12, 11 to 14, 11 to 13, 12 to 14, pH values between the foregoing ranges or values, etc.).

In some embodiments, the Mix B can include when non-magnesium based accelerators (e.g., SHMP). The content of such accelerators is relatively small; however, such accelerators can greatly improve the resulting cured product (e.g., with respect to strength, cure time and/or another property). For example, in some arrangements, the content of such non-magnesium based accelerators in the mix is less than 2% by weight of the entire dry mixture (e.g., 0%-2%, 0.1%-2%, 0%-1%, 0.1%-1%, 1%-2%, specific percentages between the foregoing ranges, etc.).

According to some embodiments, when the dry mix is combined with water or another liquid, the resulting cured product comprises a 1-day strength of at least 1000 psi (e.g., at least 1000 psi, at least 1500 psi, at least 2000 psi, at least 2500 psi, at least 3000 psi, values greater than 3000 psi, etc.).

According to some embodiments, when the dry mix is combined with water or another liquid, the resulting cured product comprises a 7-day strength of at least 3000 psi (e.g., at least 3000 psi, at least 3500 psi, at least 4000 psi, at least 4500 psi, at least 5000 psi, values greater than 5000 psi, etc.).

TABLE B1

Mix B - Composition

| Component | Proportion (by weight) of dry mix | Proportion (by weight of dry mix) relative to MgO |
|---|---|---|
| MgO | 25%-35% | |
| Primary cementitious component (e.g., slag cement, Class C fly ash) | 25%-35% | 90%-110% |
| $MgCl_2 \cdot 6H_2O$ or $Mg(NO_3)_2 \cdot 6H_2O$ | 0%-3% | 0%-12% |
| $MgSO_4 \cdot 7H_2O$ | 3%-18% | 12%-45% |
| Other accelerators | 0%-2% | 0%-5% |
| Fillers/Other additives | 10%-45% | |

TABLE B2

Mix B - Properties of Cured Mix

| Property | Value |
|---|---|
| 1-day Strength (per ASTM C39 & ASTM C109) | >1000 psi |
| 7-day Strength (per ASTM C39 & ASTM C109) | >3000 psi |
| 28-day Strength (per ASTM C39 & ASTM C109) | >4000 psi |

Mix C1

According to some embodiments, a curable mix can comprise MgO, a primary cementitious component (e.g., slag cement, Class C fly ash) and $MgSO_4$ (e.g., as the primary accelerator). One example of such a mix is detailed in Tables C1-1 and C1-2 below. As can be seen from Table C1-1, such mixes can also include other types of accelerators and certain fillers and other additives.

In some arrangements, as noted in Table C1-1, the proportion of $MgSO_4$, specifically in the form of $MgSO_4 \cdot 7H_2O$, by percentage of weight in the dry mix or formulation is 80% to 140% (e.g., 80%-140%, 80%-130%, 80%-120%, 80%-110%, 85%-140%, 85%-130%, 85%-120%, 85%-110%, 90%-140%, 90%-130%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, 105-130%, 105-140%, values between the foregoing ranges, etc.) of the proportion of MgO by percentage of weight in the dry mix or formulation.

According to some embodiments, when the dry mix is combined with water or another liquid, the resulting cured product comprises a 1-day strength of at least 1000 psi (e.g., at least 1000 psi, at least 1500 psi, at least 2000 psi, at least 2500 psi, at least 3000 psi, values greater than 3000 psi, etc.).

According to some embodiments, when the dry mix is combined with water or another liquid, the resulting cured product comprises a 7-day strength of at least 3000 psi (e.g., at least 3000 psi, at least 3500 psi, at least 4000 psi, at least 4500 psi, at least 5000 psi, values greater than 5000 psi, etc.).

TABLE C1-1

Mix C1 - Composition

| Component | Proportion (by weight) of dry mix | Proportion (by weight of dry mix) relative to MgO |
|---|---|---|
| MgO | 20%-30% | |
| Primary cementitious component (e.g., slag, Class C fly ash) | 20%-30% | 90%-110% |
| $MgSO_4 \cdot 7H_2O$ | 20%-40% | 80%-140% |
| Other accelerators | 0%-2% | 0%-5% |
| Fillers/Other additives | 10%-35% | |

TABLE C1-2

Mix C1 - Properties of Cured Mix

| Property | Value |
|---|---|
| 1-day Strength (per ASTM C39 & ASTM C109) | >1000 psi |
| 7-day Strength (per ASTM C39 & ASTM C109) | >3000 psi |
| 28-day Strength (per ASTM C39 & ASTM C109) | >4000 psi |

Mix C2

Another example of a curable mix that comprises MgO, a primary cementitious component (e.g., slag cement, Class C fly ash) and $MgSO_4$ (e.g., as the primary accelerator) is detailed in Tables C2-1 and C2-2 below. As can be seen from Table C2-1, such mixes can also include other types of accelerators and certain fillers and other additives.

In some arrangements, as noted in Table C2-1, the proportion of $MgSO_4$, specifically in the form of $MgSO_4.7H_2O$, by percentage of weight in the dry mix or formulation is 5% to 45% (e.g., 5%-45%, 5%-40%, 5%-35%, 5%-30%, 5%-25%, 5%-20%, 5%-15%, 5%-10%, 10%-45%, 10%-40%, 10%-35%, 10%-30%, 10%-25%, 10%-20%, 10%-15%, 20%-45%, 20%-40%, 20%-35%, 20%-30%, 20%-25%, 25%-35%, 25%-30%, 30%-45%, 30%-40%, 30%-35%, values between the foregoing ranges, etc.) of the proportion of MgO by percentage of weight in the dry mix or formulation.

According to some embodiments, when the dry mix is combined with water or another liquid, the resulting cured product comprises a 1-day strength of at least 100 psi (e.g., at least 100 psi, at least 150 psi, at least 200 psi, at least 250 psi, at least 300 psi, at least 500 psi, at least 1000 psi, at least 2000 psi, values greater than 2000 psi, etc.).

According to some embodiments, when the dry mix is combined with water or another liquid, the resulting cured product comprises a 7-day strength of at least 2000 psi (e.g., at least 2000 psi, at least 2500 psi, at least 3000 psi, at least 3500 psi, at least 4000 psi, values greater than 4000 psi, etc.).

TABLE C2-1

Mix C2 - Composition

| Component | Proportion (by weight) of dry mix | Proportion (by weight of dry mix) relative to MgO |
|---|---|---|
| MgO | 25%-50% | |
| Primary cementitious component (e.g., slag cement, Class C fly ash) | 25%-50% | 90%-110% |
| $MgSO_4 \cdot 7H_2O$ | 1%-20% | 5%-45% |
| Other accelerators | 0%-5% | 0%-10% |
| Fillers/Other additives | 10%-40% | |

TABLE C2-2

Mix C2 - Properties of Cured Mix

| Property | Value |
|---|---|
| 1-day Strength (per ASTM C39 & ASTM C109) | >100 psi |
| 7-day Strength (per ASTM C39 & ASTM C109) | >2000 psi |
| 28-day Strength (per ASTM C39 & ASTM C109) | >3000 psi |

As discussed above and illustrated in Tables C1-1 and C2-1, the proportions of MgO and primary cementitious component (e.g., slag cement, Class C fly ash, etc.) in the formulation (e.g., the dry formulation before any water and/or other liquid is added) can be relatively equal to one another. For example, the proportion of the primary cementitious component by percentage of weight in the dry mix or formulation is 70% to 130% (e.g., 70%-130%, 80%-120%, 90%-110%, 95%-105%, values between the foregoing ranges, etc.) of the proportion of MgO by percentage of weight in the dry mix or formulation.

As also noted above and indicated in Tables C1-1 and C2-1, the formulation or mix can comprise a combined MgO and primary cementitious component content, as a percentage by weight of the dry formulation or mix, that is 40% to 80% (e.g., 40%-80%, 40%-75%, 40%-70%, 40%-65%, 40%-60%, 40%-55%, 40%-50%, 40%-45%, 45%-80%, 45%-75%, 45%-70%, 45%-65%, 45%-60%, 45%-55%, 45%-50%, 50%-80%, 50%-75%, 50%-70%, 50%-65%, 50%-60%, 50%-55%, 55%-80%, 55%-75%, 55%-70%, 55%-65%, 55%-60%, 60%-80%, 60%-75%, 60%-70%, 60%-65%, 65%-80%, 65%-75%, 65%-70%, 70%-80%, 70%-75%, 75-80%, percentages between the foregoing ranges, etc.).

Mix D

According to some embodiments, a curable mix can comprise MgO, a primary cementitious component (e.g., slag cement, Class C fly ash) and $MgCl_2$ (and/or $Mg(NO_3)_2$) and $MgSO_4$ as the primary accelerators. One example of such a mix is detailed in Tables D1 and D2 below. As can be seen from Table D1, such mixes can also include other types of accelerators and certain fillers and other additives.

In some arrangements, as noted in Table D1, the proportion of $MgCl_2$ and/or $Mg(NO_3)_2$, specifically in the form of $MgCl_2.6H_2O$ and/or $Mg(NO_3)_2.6H_2O$, respectively, by percentage of weight in the dry mix or formulation is 1% to 30% (e.g., 0%, 0%-30%, 0%-25%, 0%-20%, 0%-15%, 0%-10%, 0%-5%, 1%-30%, 1%-25%, 1%-20%, 1%-15%, 1%-10%, 1%-5%, 2%-30%, 2%-25%, 2%-15%, 2%-12%, 2%-10%, 2%-8%, 2%-6%, 2%-5%, 2%-4%, 2%-3%, 3%-30%, 3%, 25%, 3%, 15%, 3%-12%, 3%-10%, 3%-8%, 3%-6%, 3%-5%, 3%-4%, 5%-30%, 5%-25%, 5%-20%, 5%-15%, 5%-12%, 5%-10%, 10%-30%, 10%-20%, 15%-25%, 15%-30%, values between the foregoing ranges, etc.) of the proportion of MgO by percentage of weight in the dry mix or formulation.

In addition, in some configurations, as also noted in Table D1, the proportion of $MgSO_4$, specifically in the form of $MgSO_4.7H_2O$, by percentage of weight in the dry mix or formulation is 15% to 50% (e.g., 15%-50%, 15%-45%, 15-40%, 15%-35%, 20%-50%, 20%-45%, 20%-40%, 20%-35%, 25%-50%, 25-45%, 25%-40%, 25%-35%, 25%-30%, 30%-35%, values between the foregoing ranges, etc.) of the proportion of MgO by percentage of weight in the dry mix or formulation.

According to some embodiments, such mixes can be suitable for long-term contact with reinforcing bar (rebar), mesh, other types of steel (beams, channels, rods, fasteners, etc.) and/or any other metal or material susceptible to corrosion when the $MgCl_2$, $Mg(NO_3)$ and the $MgSO_4$ contents in the mixes are below certain low thresholds. For example, such mixes can be suitable for long-term contact with rebar and the like as long the proportion of $MgSO_4$, specifically in the form of $MgSO_4.7H_2O$, by percentage of weight in the dry mix or formulation is less than 35% (e.g., less than 35%, 30%, 25% or 20%, between 15% and 35%, values between the foregoing ranges and values, etc.) of the proportion of MgO by percentage of weight in the dry mix or formulation.

In other embodiments, such mixes can be suitable for long-term contact with rebar and the like as long the proportion of $MgSO_4$, specifically in the form of $MgSO_4.7H_2O$, by percentage of weight in the dry mix or formulation is less than 50% (e.g., less than 50%, 45%, 40%, 35%, 30%, 25% or 20%, between 15% and 35%, values between the foregoing ranges and values, etc.) of the proportion of MgO by percentage of weight in the dry mix or formulation.

Also by way of example, such mixes can be suitable for long-term contact with rebar and the like as long the proportion of $MgCl_2$, $Mg(NO_3)$, specifically in the form of $MgCl_2 \cdot 6H_2O$ and/or $Mg(NO_3)_2 \cdot 6H_2O$, respectively, by percentage of weight in the dry mix or formulation is less than 12% (e.g., less than 12%, 11%, 10%, 9%, 8%, 7%, 6%, 5%, 4%, 3%, between 2% and 12%, between 2% and 10%, between 2% and 7% values between the foregoing ranges and values, etc.) of the proportion of MgO by percentage of weight in the dry mix or formulation.

For example, in some arrangements, the pH of the mix (e.g., dry mix) and/or the resulting paste and cured product is 8 to 11 (e.g., 8-11, 8-10, 8-9, 9-11, 9-10, 8.5, 9.5, 8-9.5, 8.5-11. 8.5-10, ranges between the foregoing values, etc.). In some arrangements, the pH of the mix (e.g., dry mix) and/or the resulting paste and cured product is 10 or above (e.g., 10, 11, 12, 13, 10 to 11, 11 to 12, 12 to 13, above 13, 10 to 14, 10 to 13, 10 to 12, 11 to 14, 11 to 13, 12 to 14, pH values between the foregoing ranges or values, etc.).

In some embodiments, the Mix D can include when non-magnesium based accelerators (e.g., SHMP). For example, in some arrangements, the content of such non-magnesium based accelerators in the mix is less than 4% by weight of the entire dry mixture (e.g., 0%-4%, 0.1%-4%, 0%-3%, 0%-2%, 0%-1%, 0.1%-1%, 1%-2%, 0%-2%, 0.1%-2%, 0%-1%, 0.1%-1%, 1%-2%, specific percentages between the foregoing ranges, etc.).

As discussed above and illustrated in Table D1, the proportions of MgO and primary cementitious component (e.g., slag cement, Class C fly ash, etc.) in the formulation (e.g., the dry formulation before any water and/or other liquid is added) can be relatively equal to one another. For example, the proportion of the primary cementitious component by percentage of weight in the dry mix or formulation is 70% to 130% (e.g., 70%-130%, 80%-120%, 90%-110%, 95%-105%, values between the foregoing ranges, etc.) of the proportion of MgO by percentage of weight in the dry mix or formulation.

As also noted above and indicated in Table D1, the formulation or mix can comprise a combined MgO and primary cementitious component content, as a percentage by weight of the dry formulation or mix, that is 40% to 80% (e.g., 40%-80%, 40%-75%, 40%-70%, 40%-65%, 40%-60%, 40%-55%, 40%-50%, 40%-45%, 45%-80%, 45%-75%, 45%-70%, 45%-65%, 45%-60%, 45%-55%, 45%-50%, 50%-80%, 50%-75%, 50%-70%, 50%-65%, 50%-60%, 50%-55%, 55%-80%, 55%-75%, 55%-70%, 55%-65%, 55%-60%, 60%-80%, 60%-75%, 60%-70%, 60%-65%, 65%-80%, 65%-75%, 65%-70%, 70%-80%, 70%-75%, 75-80%, percentages between the foregoing ranges, etc.).

According to some embodiments, when the dry mix is combined with water or another liquid, the resulting cured product comprises a 1-day strength of at least 1000 psi (e.g., at least 1000 psi, at least 1500 psi, at least 2000 psi, at least 2500 psi, at least 3000 psi, values greater than 3000 psi, etc.).

According to some embodiments, when the dry mix is combined with water or another liquid, the resulting cured product comprises a 7-day strength of at least 3000 psi (e.g., at least 3000 psi, at least 3500 psi, at least 4000 psi, at least 4500 psi, at least 5000 psi, values greater than 5000 psi, etc.).

TABLE D1

Mix D - Composition

| Component | Proportion (by weight) of dry mix | Proportion (by weight of dry mix) relative to MgO |
|---|---|---|
| MgO | 25%-35% | |
| Primary cementitious component (e.g., slag cement, Class C fly ash) | 25%-35% | 90%-110% |
| $MgCl_2 \cdot 6H_2O$ or $Mg(NO_3)_2 \cdot 6H_2O$ | 0%-10% | 0%-30% |
| $MgSO_4 \cdot 7H_2O$ | 4%-17% | 15%-50% |
| Other accelerators | 0%-4% | 0%-10% |
| Fillers/Other additives | 10%-45% | |

TABLE D2

Mix D - Properties of Cured Mix

| Property | Value |
|---|---|
| 1-day Strength (per ASTM C39 & ASTM C109) | >1000 psi |
| 7-day Strength (per ASTM C39 & ASTM C109) | >3000 psi |
| 28-day Strength (per ASTM C39 & ASTM C109) | >4000 psi |

Mix E

According to some embodiments, a curable mix can comprise MgO, a primary cementitious component (e.g., slag cement, Class C fly ash), $MgSO_4$ as the primary accelerator and aggregate and/or other fillers. One example of such a mix is detailed in Tables E1 and E2 below. As can be seen from Table E1, such mixes can also include other types of accelerators.

According to some arrangements, the proportion of MgO in the dry mixture (e.g., before the mixture is combined with water and/or another liquid) is 6% to 20% (e.g., 6%-20%, 10%-20%, 10%-15%, 15%-20%, 6%-15%, values between the foregoing ranges, etc.) of the dry mixture by weight. Likewise, in some arrangements, the proportion of slag in the dry mixture (e.g., before the mixture is combined with water and/or another liquid) is 6% to 20% (e.g., 6%-20%, 10%-20%, 10%-15%, 15%-20%, 6%-15%, values between the foregoing ranges, etc.) of the dry mixture by weight.

As with other embodiments disclosed herein and indicated in Table E1, the proportion of a primary cementitious component (e.g., slag cement, Class C fly ash) by percentage of weight in the dry mix or formulation is 70% to 130% (e.g., 70%-130%, 80%-120%, 90%-110%, 95%-105%, 98%-102%, 80%-100%, 85%100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of MgO by percentage of weight in the dry mix or formulation.

As also noted above and indicated in Table E1, the formulation or mix can comprise a combined MgO and primary cementitious component content, as a percentage by weight of the dry formulation or mix, that is 10% to 50% (e.g., 10%-50%, 10%-45%, 10%-40%, 10%-35%, 10%-30%, 10%-25%, 10%-20%, 10%-15%, 15%-50%, 15%-45%, 15%-40%, 15%-35%, 15%-30%, 15%-25%, 15%-20%, 20%-50%, 20%-45%, 20%-40%, 20%-35%, 20%-30%, 20%-25%, 25%-50%, 25%-45%, 25%-40%, 25%-35%, 25%-30%, 30%-50%, 30%-45%, 30%-40%, 30%-

35%, 35%-50%, 35%-45%, 35%-40%, 40%-50%, 40%-45%, 45-50%, percentages between the foregoing ranges, etc.).

In some arrangements, as noted in Table E1, the proportion of $MgSO_4$, specifically in the form of $MgSO_4.7H_2O$, by percentage of weight in the dry mix or formulation is 25% to 45% (e.g., 25%, 30%, 35%, 40%, 45%, 25%-45%, 30%-45%, 35%-45%, 40%-45%, 25%-40%, 30%-40%, 35%-40%, 25%-35%, 30%-35%, percentage values between the foregoing values and ranges, etc.) of the proportion of MgO by percentage of weight in the dry mix or formulation.

In some arrangements, as noted in Table E1, a substantial portion of the dry mix is comprised of aggregate and/or other fillers or additives. For example, in some embodiments, the proportion of aggregate (and/or other fillers or additives) by percentage of weight in the dry mix or formulation is 300% to 1000% (e.g., 300%, 350%, 400%, 450%, 500%, 550%, 600%, 650%, 700%, 750%, 800%, 850%, 900%, 950%, 1000%, 300%-400%, 300%-500%, 300%-600%, 300%-700%, 300%-800%, 300%-900%, 300%-1000%, 400%-500%, 400%-600%, 400%-700%, 400%-800%, 400%-900%, 400%-1000%, 500%-600%, 500%-700%, 500%-800%, 500%-900%, 500%-1000%, 600%-700%, 600%-800%, 600%-900%, 600%-1000%, 700%-800%, 700%-900%, 700%-1000%, 800%-900%, 800%-1000%, 900%-1000%, percentage values between the foregoing values and ranges, etc.) of the proportion of MgO by percentage of weight in the dry mix or formulation.

In other arrangements, the proportion of aggregate (and/or other fillers or additives) by percentage of weight in the dry mix or formulation is greater than 1000% (e.g., 1000%-1100%, 1000%-1200%, 1000%-1300%, 1000%-1400%, 1000%-1500%, 1100%-1200%, 1100%-1300%, 1100%-1400%, 1100-1500%, 1200%-1300%, 1200%-1400%, 1200%-1500%, 1300%-1400%, 1300%-1500%, 1400%-1500%, greater than 1500%, percentage values between the foregoing values and ranges, etc.) of the proportion of MgO by percentage of weight in the dry mix or formulation.

According to some embodiments, when the dry mix is combined with water or another liquid, the resulting cured product comprises a 1-day strength of at least 1000 psi (e.g., at least 1000 psi, at least 1500 psi, at least 2000 psi, at least 2500 psi, at least 3000 psi, values greater than 3000 psi, etc.).

According to some embodiments, when the dry mix is combined with water or another liquid, the resulting cured product comprises a 7-day strength of at least 2000 psi (e.g., at least 2000 psi, at least 2500 psi, at least 3000 psi, at least 3500 psi, at least 4000 psi, at least 4500 psi, at least 5000 psi, values greater than 5000 psi, etc.).

TABLE E1

Mix E - Composition

| Component | Proportion (by weight) of dry mix | Proportion (by weight of dry mix) relative to MgO |
|---|---|---|
| MgO | 6%-20% | |
| Primary cementitious component (e.g., slag cement, Class C fly ash) | 6%-20% | 90%-110% |
| $MgSO_4 \cdot 7H_2O$ | 2%-8% | 25%-45% |
| Other accelerators (e.g., $MgCl_2$, $Mg(NO_3)_2$, etc.) | 0%-2% | 0%-10% |
| Fillers/Other additives | 40%-90% | 300%-1000% |

TABLE A2

Mix E - Properties of Cured Mix

| Property | Value |
|---|---|
| 1-day Strength (per ASTM C39 & ASTM C109) | >1000 psi |
| 7-day Strength (per ASTM C39 & ASTM C109) | >2000 psi |
| 28-day Strength (per ASTM C39 & ASTM C109) | >3000 psi |

Mix F

According to some embodiments, a curable mix can comprise MgO and $MgCl_2$ (and/or $Mg(NO_3)_2$) and $MgSO_4$ as the primary accelerators. One example of such a mix is detailed in Tables F1 and F2 below. As can be seen from Table F1, such mixes can also include other types of accelerators, slag and certain fillers and other additives.

In some arrangements, as noted in Table F1, the proportion of $MgCl_2$ and/or $Mg(NO_3)_2$, specifically in the form of $MgCl_2.6H_2O$ and/or $Mg(NO_3)_2.6H_2O$, respectively, by percentage of weight in the dry mix or formulation is 70% to 120% (e.g., 70%-120%, 75%-120%, 80%-120%, 90%-120%, 90%-110%, 95%-105%, 98%-102%, 80%-100%, 85%-100%, 90%-100%, 95%-100%, 80%-90%, 85%-95%, 100%-120%, 100%-115%, 100%-110%, 100%-105%, 105%-115%, 105%-120%, values between the foregoing ranges, etc.) of the proportion of MgO by percentage of weight in the dry mix or formulation.

Further, as also illustrated in the embodiment represented in Table F1, the proportion of fillers and/or other additives (e.g., aggregate) by percentage of weight in the dry mix or formulation is 400% to 550% (e.g., 400%-550%, 400%-450%, 400%-500%, 450%-550%, 450%-550%, 500%-550%, 400%-550%, values between the foregoing ranges, etc.) of the proportion of MgO by percentage of weight in the dry mix or formulation.

According to some embodiments, the curing time and short-term (e.g., 1-day, 7-day, etc.) compressive strength of cured products made from such mixes is relatively high. For example, in some arrangements, the resulting cured products have a 1-day strength of at least 5500 psi (e.g., 5500, 5600, 5700, 5800, 5900, 6000, 6500, 7000 psi, greater than 7000 psi, values between the foregoing, etc.). Moreover, in some embodiments, the resulting cured products have a 7-day strength of at least 7000 psi (e.g., 7000, 7100, 7200, 7300, 7400, 7500, 7600, 7700, 7800, 7900, 8000, 8500 psi, greater than 8500 psi, values between the foregoing, etc.). Moreover, in some embodiments,

TABLE F1

Mix F - Composition

| Component | Proportion (by weight) of dry mix | Proportion (by weight of dry mix) relative to MgO |
|---|---|---|
| MgO | 10%-20% | |
| $MgCl_2 \cdot 6H_2O$ or $Mg(NO_3)_2 \cdot 6H_2O$ | 6%-25% | 70%-120% |
| Other accelerators | 0%-2% | 0%-5% |
| Primary cementitious component (e.g., slag cement, Class C fly ash) | 0%-5% | 0%-25% |
| Fillers/Other additives | 45%-80% | 400%-550% |

TABLE F2

Mix F - Properties of Cured Mix

| Property | Value |
| --- | --- |
| 1-day Strength (per ASTM C39 & ASTM C109) | >5500 psi |
| 7-day Strength (per ASTM C39 & ASTM C109) | >7000 psi |

The mixes, formulations, systems, apparatuses, devices and/or other articles disclosed herein may be manufactured or otherwise formed through any suitable means. The various methods and techniques described above provide a number of ways to carry out the disclosed inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the inventions disclosed herein.

Although several embodiments and examples are disclosed herein, the present application extends beyond the specifically disclosed embodiments to other alternative embodiments and/or uses of the inventions and modifications and equivalents thereof. It is also contemplated that various combinations or subcombinations of the specific features and aspects of the embodiments may be made and still fall within the scope of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

While the embodiments disclosed herein are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 10%" includes "10%." Terms or phrases preceded by a term such as "substantially" include the recited term or phrase. For example, "substantially parallel" includes "parallel."

What is claimed is:

1. A curable mixture configured to set in the presence of water, the mixture comprising:
   magnesium oxide;
   a primary cementitious component; and
   at least one accelerant, wherein the at least one accelerant comprises at least one of the following: magnesium chloride, magnesium nitrate, and magnesium sulfate;
   wherein a proportion by weight of the primary cementitious component is 80% to 120% of a proportion of magnesium oxide by weight of the mixture;
   wherein a sum of the proportions of magnesium oxide and the primary cementitious component comprises at least 15% by weight of the mixture;
   wherein the mixture does not include Portland cement;
   wherein the 7-day strength of the mixture once combined with water and permitted to cure is at least 2000 psi; and
   wherein a pH of a final cured product resulting from combining the mixture with water is greater than 8.

2. The mixture of claim 1, wherein the sum of the proportions of magnesium oxide and the primary cementitious component is 15% to 50% by weight of the mixture.

3. The mixture of claim 1, wherein a proportion by weight of the at least one accelerant is 80% to 145% of the proportion of magnesium oxide by weight of the mixture.

4. The mixture of claim 1:
   wherein the at least one accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 1% to 30% of the proportion of magnesium oxide by weight of the mixture; and
   wherein the at least one accelerant further comprises magnesium sulfate in the form of $MgSO_4.7H_2O$, wherein a proportion by weight of $MgSO_4.7H_2O$ is 15% to 50% of the proportion of magnesium oxide by weight of the mixture.

5. The mixture of claim 1, wherein the at least one accelerant does not comprise a phosphate-based material.

6. The mixture of claim 1, wherein the at least one accelerant further comprises a phosphate-based accelerant, wherein a proportion by weight of the phosphate-based accelerant is 0.1% to 5% of the proportion of magnesium oxide by weight of the mixture.

7. The mixture of claim 1,
   wherein the at least one accelerant comprises magnesium chloride in the form of $MgCl_2.6H_2O$ or magnesium nitrate in the form of $Mg(NO_3)_2.6H_2O$;
   wherein a proportion by weight of $MgCl_2.6H_2O$ or $Mg(NO_3)_2.6H_2O$ is 80% to 120% of the proportion of magnesium oxide by weight of the mixture.

8. The mixture of claim 1,
   wherein the at least one accelerant comprises magnesium sulfate in the form of $MgSO_4.7H_2O$;
   wherein a proportion by weight of $MgSO_4.7H_2O$ is 90% to 140% of the proportion of magnesium oxide by weight of the mixture.

9. The mixture of claim 1, wherein the sum of the proportions of magnesium oxide and the primary cementitious component is 40% to 70% by weight of the mixture.

10. The mixture of claim 1, wherein the proportion by weight of the primary cementitious component is 90% to 110% of the proportion of magnesium oxide by weight of the mixture.

11. The mixture of claim 1, wherein the primary cementitious component comprises at least one of slag cement and Class C fly ash.

12. A curable mixture configured to set in the presence of water, the mixture comprising:
   magnesium oxide;
   a primary cementitious component;
   wherein a proportion by weight of the primary cementitious component is 80% to 120% of a proportion of magnesium oxide by weight of the mixture; and
   at least one accelerant, wherein the at least one accelerant comprises magnesium chloride in the form of $MgCl_2.6H_2O$ or magnesium nitrate in the form of $Mg(NO_3)_2.6H_2O$;
   wherein a proportion by weight of $MgCl_2.6H_2O$ or $Mg(NO_3)_2.6H_2O$ is 80% to 120% of the proportion of magnesium oxide by weight of the mixture;
   wherein the mixture does not include Portland cement;
   wherein the 7-day strength of the mixture once combined with water and permitted to cure is at least 2000 psi; and
   wherein a pH of a final cured product resulting from combining the mixture with water is greater than 8.

13. The mixture of claim 12, wherein the sum of the proportions of magnesium oxide and the primary cementitious component is 15% to 50% by weight of the mixture.

14. The mixture of claim 12, wherein the sum of the proportions of magnesium oxide and the primary cementitious component is 40% to 70% by weight of the mixture.

15. The mixture of claim 12:
   wherein the at least one accelerant comprises magnesium chloride in the form of $MgCl_2.6H_2O$ or magnesium nitrate in the form of $Mg(NO_3)_2.6H_2O$, wherein a proportion by weight of $MgCl_2.6H_2O$ or $Mg(NO_3)_2.6H_2O$ is 1% to 30% of the proportion of magnesium oxide by weight of the mixture; and
   wherein the at least one accelerant further comprises magnesium sulfate in the form of $MgSO_4.7H_2O$, wherein a proportion by weight of $MgSO_4.7H_2O$ is 15% to 50% of the proportion of magnesium oxide by weight of the mixture.

16. The mixture of claim 12,
   wherein the at least one accelerant comprises magnesium chloride in the form of $MgCl_2.6H_2O$ or magnesium nitrate in the form of $Mg(NO_3)_2.6H_2O$;
   wherein a proportion by weight of $MgCl_2.6H_2O$ or $Mg(NO_3)_2.6H_2O$ is 80% to 120% of the proportion of magnesium oxide by weight of the mixture.

17. The mixture of claim 12,
   wherein the at least one accelerant comprises magnesium sulfate in the form of $MgSO_4.7H_2O$;
   wherein a proportion by weight of $MgSO_4.7H_2O$ is 90% to 140% of the proportion of magnesium oxide by weight of the mixture.

18. The mixture of claim 12, wherein the primary cementitious component comprises at least one of slag cement and Class C fly ash.

* * * * *